United States Patent
Kikukawa

(10) Patent No.: US 11,109,009 B2
(45) Date of Patent: Aug. 31, 2021

(54) IMAGE PROCESSOR AND CONTROL METHOD OF IMAGE PROCESSOR

(71) Applicant: SONY CORPORATION, Tokyo (JP)

(72) Inventor: Tetsuya Kikukawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/603,076

(22) PCT Filed: Jul. 5, 2018

(86) PCT No.: PCT/JP2018/025470
§ 371 (c)(1),
(2) Date: Oct. 4, 2019

(87) PCT Pub. No.: WO2019/017207
PCT Pub. Date: Jan. 24, 2019

(65) Prior Publication Data
US 2020/0053337 A1 Feb. 13, 2020

(30) Foreign Application Priority Data
Jul. 19, 2017 (JP) .............................. JP2017-140080

(51) Int. Cl.
*H04N 13/117* (2018.01)
*G06T 19/00* (2011.01)
*G02B 27/10* (2006.01)
*H04N 13/128* (2018.01)
(Continued)

(52) U.S. Cl.
CPC ......... *H04N 13/117* (2018.05); *H04N 13/128* (2018.05); *H04N 13/344* (2018.05); *H04N 13/383* (2018.05)

(58) Field of Classification Search
USPC .......................................................... 348/43
See application file for complete search history.

(56) References Cited

U.S. PATENT DOCUMENTS

| | | | |
|---|---|---|---|
| 2009/0213147 A1* | 8/2009 | Sagardoyburu | G02B 27/0093 345/690 |
| 2014/0118509 A1 | 5/2014 | Kroon | |

(Continued)

FOREIGN PATENT DOCUMENTS

| | | |
|---|---|---|
| EP | 2605521 A1 | 6/2013 |
| JP | 2010-266989 A | 11/2010 |
| WO | WO 00/036845 A1 | 6/2000 |

*Primary Examiner* — Jeffery A Williams
(74) *Attorney, Agent, or Firm* — Paratus Law Group, PLLC

(57) ABSTRACT

A disparity image in a stereoscopic image is generated not to collapse. In a case where a viewing position in the entire celestial image space, specified on the basis of position information of a user, is within a range of a predetermined distance from an original point in a coordinate system of the entire celestial image, a disparity image based on the viewing position is generated, and in a case where the viewing position in the entire celestial image space is not within the range of a predetermined distance from the original point in the coordinate system of the entire celestial image, the viewing position in the entire celestial image space is moved to the original point of the entire celestial image space, and the disparity image is generated. The present disclosure can be applied to an HMD.

21 Claims, 18 Drawing Sheets

(51) Int. Cl.
*H04N 13/383* (2018.01)
*H04N 13/344* (2018.01)

(56) References Cited

U.S. PATENT DOCUMENTS

| | | | |
|---|---|---|---|
| 2015/0145977 A1* | 5/2015 | Hoffman | H04N 13/371 |
| | | | 348/59 |
| 2015/0264340 A1 | 9/2015 | Seidl et al. | |
| 2016/0219268 A1* | 7/2016 | Strom | H04N 13/349 |
| 2016/0246055 A1 | 8/2016 | Border et al. | |

* cited by examiner

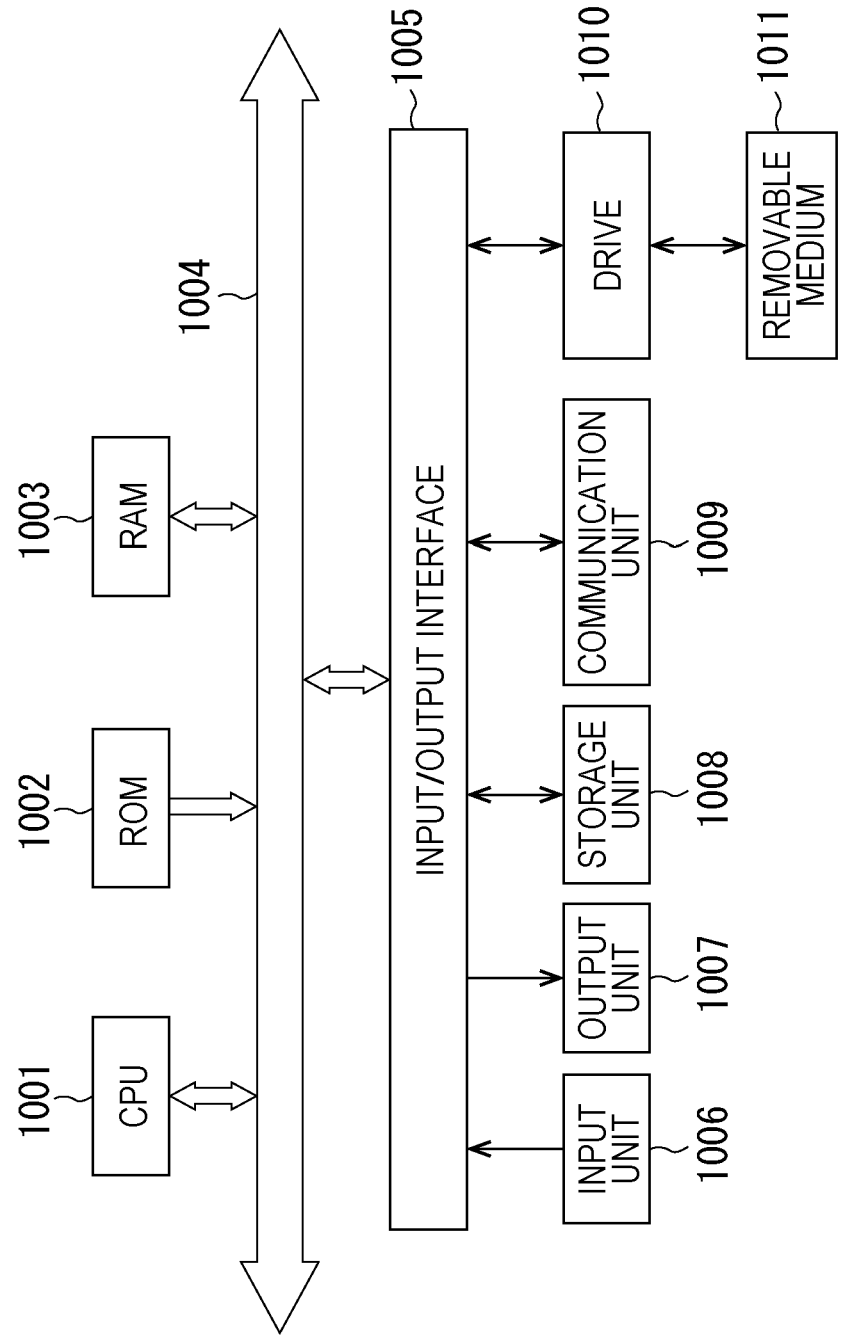

IMAGE PROCESSOR AND CONTROL METHOD OF IMAGE PROCESSOR

CROSS REFERENCE TO RELATED APPLICATIONS

This application is a National Stage Patent Application of PCT International Patent Application No. PCT/JP2018/025470 filed on Jul. 5, 2018 under 35 U.S.C. § 371, which claims the benefit of Japanese Priority Patent Application JP 2017-140080 filed on Jul. 19, 2017, the entire contents of which are all incorporated herein by reference.

TECHNICAL FIELD

The present disclosure relates to an image processor and a control method of an image processor, and in particular, relates to an image processor and a control method of an image processor in which a disparity image based on viewing information of a user can be generated.

BACKGROUND ART

Recently, a technology of viewing a stereoscopic image by using a head mounted display (HMD) has attracted attention.

The viewing of the stereoscopic image is realized by displaying an image corresponding to each of right and left eyes where there is a disparity, with respect to each of the right and left eyes in the HMD, and by allowing a user to view the image.

Here, it is known that in the case of viewing the stereoscopic image using the HMD, a shift is generated between an image to be viewed and a motion of an actual body, and thus, the user feels so-called sickness.

Therefore, a technology is proposed in which displacement information (an amount of temporal length) obtained from a motion sensor built in the HMD is used as a threshold value, and in a case where a rapid change at a viewing point, which is greater than the threshold value and leads to sickness, is detected, the image to be displayed is replaced with an image which is moderately changed, and thus, the sickness due to the viewing of the stereoscopic image using the HMD is prevented (refer to PTL 1).

CITATION LIST

Patent Literature

[PTL 1]
JP 2010-266989A

SUMMARY

Technical Problem

However, in a case where the stereoscopic image is displayed in real time, it is necessary to reflect an absolute amount of the displacement information to be detected by the motion sensor of the HMD on the display, and thus, in the case of replacing the image with a moderate image at the time of rapidly changing face orientation, there is a concern that uncomfortable feeling occurs.

In addition, there is a method of providing an upper limit in a movement rate or a movement angular rate, but there is a concern that superiority in operability where the position of the motion sensor absolutely corresponds is impaired.

The present disclosure has been made in consideration of such circumstances, and in particular, is capable of generating a disparity image in the display of a stereoscopic image on the basis of viewing information of a user.

Solution to Problem

An image processor according to one aspect of the present disclosure includes: an image generating unit configured to generate two right and left images corresponding to a right eye and a left eye of a user in a predetermined mode using image data specified by viewing information of the user in a case where the viewing information of the user satisfies a predetermined condition, and generate two right and left images corresponding to the right eye and the left eye of the user in the other predetermined mode different from the predetermined mode in a case where the viewing information of the user does not satisfy the predetermined condition.

In a case where a viewing direction of the user in a coordinate system of the image data of the user satisfies the predetermined condition, the image generating unit is capable of generating the two right and left images in the predetermined mode using the image data specified by the viewing information of the user, and in a case where the viewing direction of the user in the coordinate system of the image data of the user does not satisfy the predetermined condition, the image generating unit is capable of generating the two right and left images in the other predetermined mode.

In a case where the viewing direction is within a range of a predetermined elevation angle of the coordinate system in the image data, the image generating unit is capable of generating the two right and left images in the predetermined mode using the image data specified by the viewing direction of the user, and in a case where the viewing direction is not within the range of the predetermined elevation angle of the coordinate system in the image data, the image generating unit is capable of generating the two identical right and left images in the other predetermined mode using the image data specified by the viewing direction of the user.

The two right and left images can be two right and left disparity images.

In a case where the viewing direction is within the range of the predetermined elevation angle of the coordinate system in the image data, the image generating unit is capable of generating the two right and left images in the predetermined mode using the image data specified by the viewing direction of the user, and in a case where the viewing direction is not within the range of the predetermined elevation angle of the coordinate system in the image data, the image generating unit is capable of generating the two right and left images in the other predetermined mode using the image data specified by the viewing direction of the user to be horizontally reversed, or of generating the two right and left images such that the two right and left images are horizontally reversed.

The two right and left images can be two right and left disparity images.

A viewing direction detection unit configured to detect the viewing direction can be further provided, the viewing direction detection unit is capable of further including a face orientation direction detection unit configured to detect a face orientation direction of the user and a visual line direction detection unit configured to detect a visual line direction of the user, and the viewing direction detection unit is capable of calculating the viewing direction by using the face orientation direction and the visual line direction.

In a case where a viewing position of the user in the coordinate system of the image data of the user satisfies a predetermined condition, the image generating unit is capable of generating the two right and left images in the predetermined mode using the image data specified by the viewing information of the user, and in a case where the viewing position of the user in the coordinate system of the image data of the user does not satisfy the predetermined condition, the image generating unit is capable of generating the two right and left images in the other predetermined mode.

In a case where the viewing position is within a range of a predetermined distance from an original point of the coordinate system in the image data, the image generating unit is capable of generating the two right and left images in the predetermined mode using the image data specified on the basis of the viewing position of the user, and in a case where the viewing position is not within the range of the predetermined distance from the original point of the coordinate system in the image data, the image generating unit is capable of shifting the viewing position of the user to be the original point of the coordinate system in the image data, and of generating the two right and left images in the other predetermined mode using the image data specified on the basis of the viewing position shifted to be the original point.

The two right and left images can be two right and left disparity images.

The image generating unit is capable of gradually shifting the original point of the coordinate system in the image data to the viewing position, and of generating the two right and left disparity images in the other predetermined mode using the image data specified on the basis of the shifted viewing position.

The image generating unit is capable of gradually shifting the original point of the coordinate system in the image data to the viewing position at each predetermined interval, and of generating the two right and left disparity images in the other predetermined mode using the image data specified on the basis of the shifted viewing position.

The image generating unit is capable of gradually shifting the original point of the coordinate system in the image data to the viewing position by each predetermined distance ratio, and of generating the two right and left disparity images in the other predetermined mode using the image data specified on the basis of the shifted viewing position.

The image generating unit is capable of gradually shifting the original point of the coordinate system in the image data to the viewing position, on a shortest path to the viewing position, and of generating the two right and left disparity images in the other predetermined mode using the image data specified on the basis of the shifted viewing position.

In a case where the viewing position is not within the range of the predetermined distance from the original point of the coordinate system in the image data, and in a case where there is a change in the viewing state of the user, the image generating unit is capable of shifting the viewing position of the user to be the original point of the coordinate system in the image data, and of generating the two right and left disparity images in the other predetermined mode using the image data specified on the basis of the viewing position shifted to be the original point.

In a case where there is a change in the viewing state of the user, there can be a timing when the user blinks, a timing when the user turns round, and a timing when the user nods.

A control method of an image processor according to one aspect of the present disclosure is a control method of an image processor of generating two right and left images corresponding to a right eye and a left eye of a user in a predetermined mode using image data specified by viewing information of the user in a case where the viewing information of the user satisfies a predetermined condition, and of generating two right and left images corresponding to the right eye and the left eye of the user in the other predetermined mode different from the predetermined mode in a case where the viewing information of the user does not satisfy the predetermined condition.

In one aspect of the present disclosure, in a case where the viewing information of the user satisfies the predetermined condition, the two right and left images corresponding to the right eye and the left eye of the user are generated in the predetermined mode using the image data specified by the viewing information of the user, and in a case where the viewing information of the user does not satisfy the predetermined condition, the two right and left images corresponding to the right eye and the left eye of the user are generated in the other predetermined mode different from the predetermined mode.

Advantageous Effects of Invention

According to one aspect of the present disclosure, in particular, it is possible to suppress a collapse in a disparity image generated at the time of viewing a stereoscopic image using a head mounted display (HMD), and to suppress sickness.

BRIEF DESCRIPTION OF DRAWINGS

FIG. 18 is a diagram illustrating a configuration example of a general-purpose personal computer.

DESCRIPTION OF EMBODIMENTS

Figure 1:
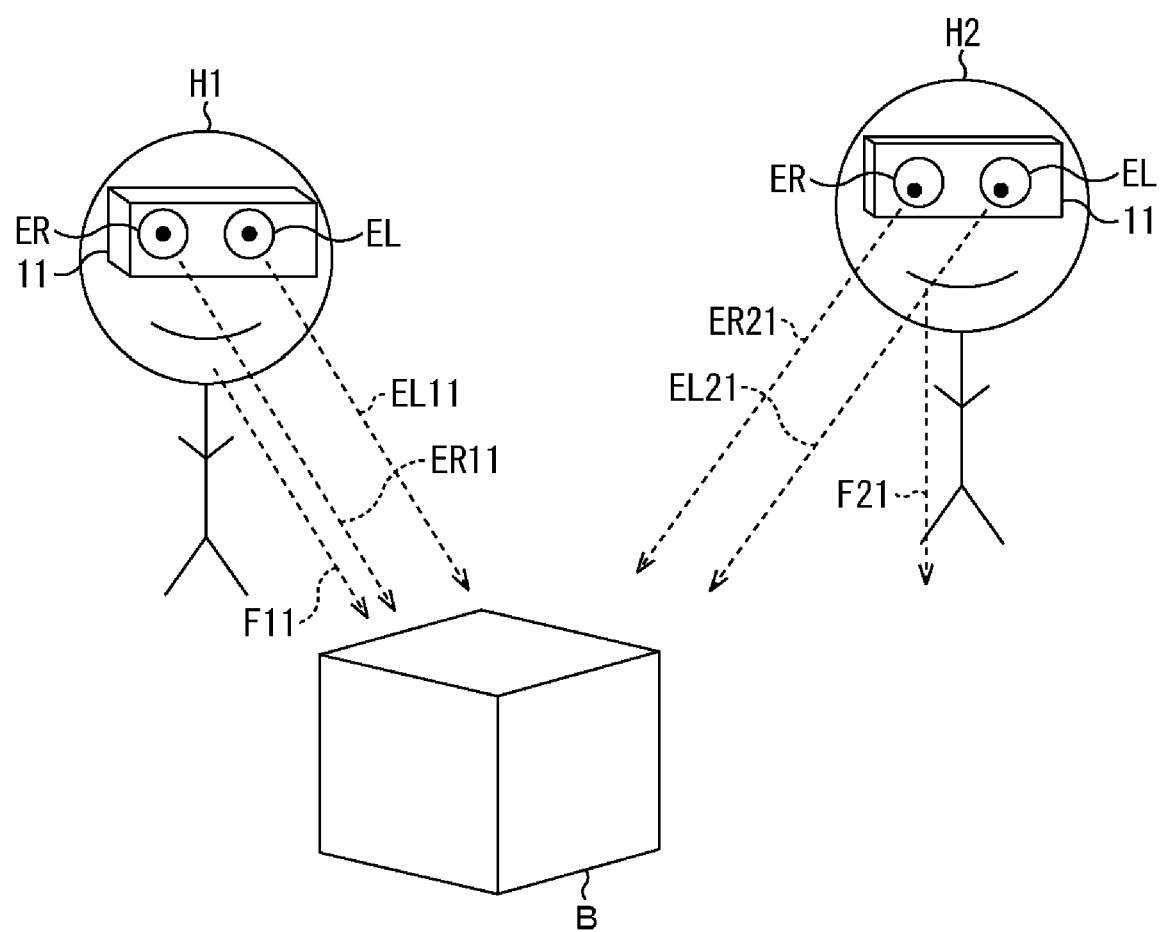
FIG. 1 is a diagram illustrating the viewing of a stereoscopic image using an HMD according to an embodiment of the present disclosure.

Hereinafter, preferred embodiments of the present disclosure will be described in detail with reference to the attached drawings. Furthermore, herein and in the drawings, the same reference numerals are applied to constituents having substantially the same functional configuration, and the repeated description will be omitted.

Hereinafter, embodiments for carrying out the present technology will be described. The description will be performed in the following order.
1. First Embodiment
2. Second Embodiment
3. Third Embodiment
4. Modification Example of Third Embodiment
5. Application Example of First Embodiment
6. Example Executed by Software

1. First Embodiment

<Viewing of Stereoscopic Image Using HMD>

The viewing of a stereoscopic image using a head mount display (HMD) is realized by displaying an image according to a viewing direction of a user wearing the HMD, with respect to right and left eyes, such that a disparity is generated, and by allowing the user to view the image.

More specifically, the image to be used for viewing the stereoscopic image using the HMD, for example, is referred to the entire celestial image, is an image imaged in all directions from a predetermined original point position, and includes an image for a left eye and an image for a right eye, having a disparity. Furthermore, the entire celestial image is not limited to the imaged image, but may be an image including computer graphics (CG) or the like.

The HMD detects a position in a space of the user wearing the HMD, face orientation, and a visual line direction, and displays a disparity image including an image for a left eye and an image for a right eye, having a corresponding suitable disparity to be viewed by each of a left eye and a right eye by using an image in a range specified from a viewing position and a viewing direction of the user in the entire celestial image.

Furthermore, here, the viewing position of the user in the entire celestial image is the position of the user in a coordinate system set in advance by an original point position (an original point O), which is the standard of the entire celestial image. The position in the entire celestial image space is associated with a real space, and in a case where position information of the user in the real space is specified, the position of the associated entire celestial image space is uniquely specified. Accordingly, hereinafter, the viewing position in the entire celestial image space is a position associated with the position information in the real space.

For example, each of users H1 and H2 illustrated in FIG. 1 wears an HMD 11, and it is considered that an image is displayed as if an object B exists in a predetermined position corresponding to each position of the users H1 and H2 in a space.

Furthermore, in FIG. 1, a state is illustrated where the object B exists in front of the users H1 and H2, but in the state illustrated in FIG. 1, the object B does not exist in front of the users H1 and H2 in the real space, but the users H1 and H2 are capable of viewing the object B in a positional relationship as illustrated in FIG. 1, by wearing the HMD 11.

That is, it is shown that the object B exists in a direction directly facing a face orientation direction F11 of the user H1 in FIG. 1. At this time, as illustrated in FIG. 1, both of a visual line direction EL11 of a left eye EL and a visual line direction ER11 of a right eye ER of the user H1 are in a parallel relationship with the face orientation direction F11. Therefore, as illustrated in FIG. 2, the visual line direction E11 which is parallel to the visual line direction EL11 of the left eye EL and the visual line direction ER11 of the right eye ER and includes an intermediate position between the left eye EL and the right eye ER as a start point, is a viewing direction of the user H1.

Figure 2:
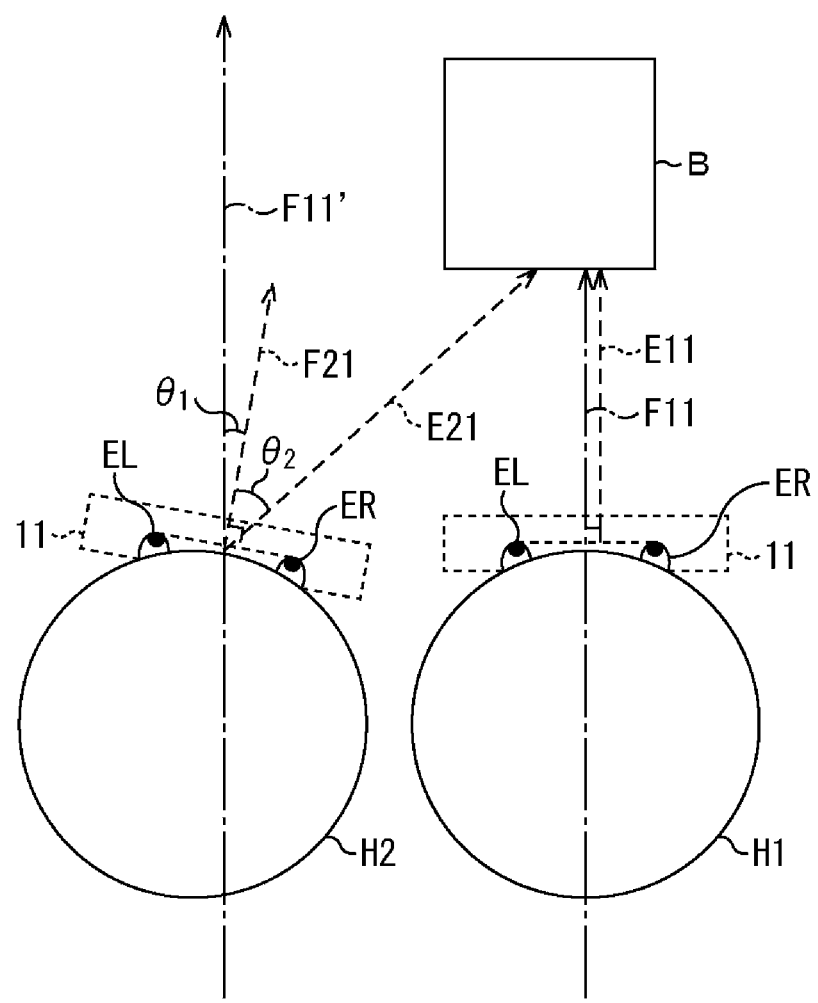
FIG. 2 is a diagram illustrating the viewing of the stereoscopic image using the HMD according to the embodiment of the present disclosure.

Furthermore, FIG. 2 illustrates a relationship between each of face orientation directions F11 and F21 and each of visual line directions E11 and E21, seen from the head of the users H1 and H2 in FIG. 1.

On the other hand, as illustrated in FIG. 2, the face orientation direction F21 of the user H2 in FIG. 1 is a direction rotated in a right direction by an angle θ1 with respect to a direction F11' parallel to the face orientation direction F11 of the user H1. In addition, in a case where the visual line direction EL21 of the left eye EL and the visual line direction ER21 of the right eye ER of the user H2 of FIG. 1 are parallel to the visual line direction E21 of FIG. 2, the visual line direction E21 is a direction rotated in the right direction by an angle θ2 with respect to the face orientation direction F21. Then, the object B exists in the visual line direction E21 of the user H2.

That is, in the case of the user H2, the visual line direction E21 which is parallel with respect to the visual line direction EL21 of the left eye EL and the visual line direction ER21 of the right eye ER of FIG. 1, and includes an intermediate position between the left eye EL and the right eye ER of FIG. 2 as a start point, is a viewing direction of the user H2.

As illustrated in FIG. 1 and FIG. 2, the visual line direction E11 of the user H1 and the visual line direction E21 of the user H2 are in a relationship of forming an angle (θ1+θ2) with each other.

The HMD 11 cuts out an image according to the position of each of the users H1 and H2 and the viewing direction in each of the positions from the entire celestial image, and displays the image as the image for a left eye and the image for a right eye such that a disparity is generated. The users H1 and H2 view each of the image for a right eye and the image for a left eye to be displayed according to each of the positions and each of the viewing directions, with each of the right eye and the left eye, and thus, are capable of viewing each of images as the stereoscopic image.

However, the entire celestial image, for example, is one or a plurality of sets of images imaged from a viewing point (the original point) which is the standard of an observation point or the like. In addition, the entire celestial image is capable of including depth information which is information of a distance from the viewing position, or of separately applying the corresponding depth information, in pixel unit configuring the image.

For example, a depth image having the same definition or different definitions, point group data including the depth information, and the like are considered as the depth information. In order to generate and display a viewing image using the entire celestial image including the depth information, it is necessary that the viewing position in the corresponding entire celestial image is specified on the basis of the position information of the user and the information of the viewing direction, a range in the entire celestial image which can be viewed at the time of seeing the viewing direction from the viewing position is specified, an image of the specified range is used, and the disparity image including the image for a left eye and the image for a right eye, having a suitable disparity, is generated and displayed.

Furthermore, herein, the entire celestial image will be described by using an image including the depth information in pixel unit as an example. Here, it is obvious that the depth information may be separately applied.

<Coordinate Conversion of Entire Celestial Image>

Figure 3:
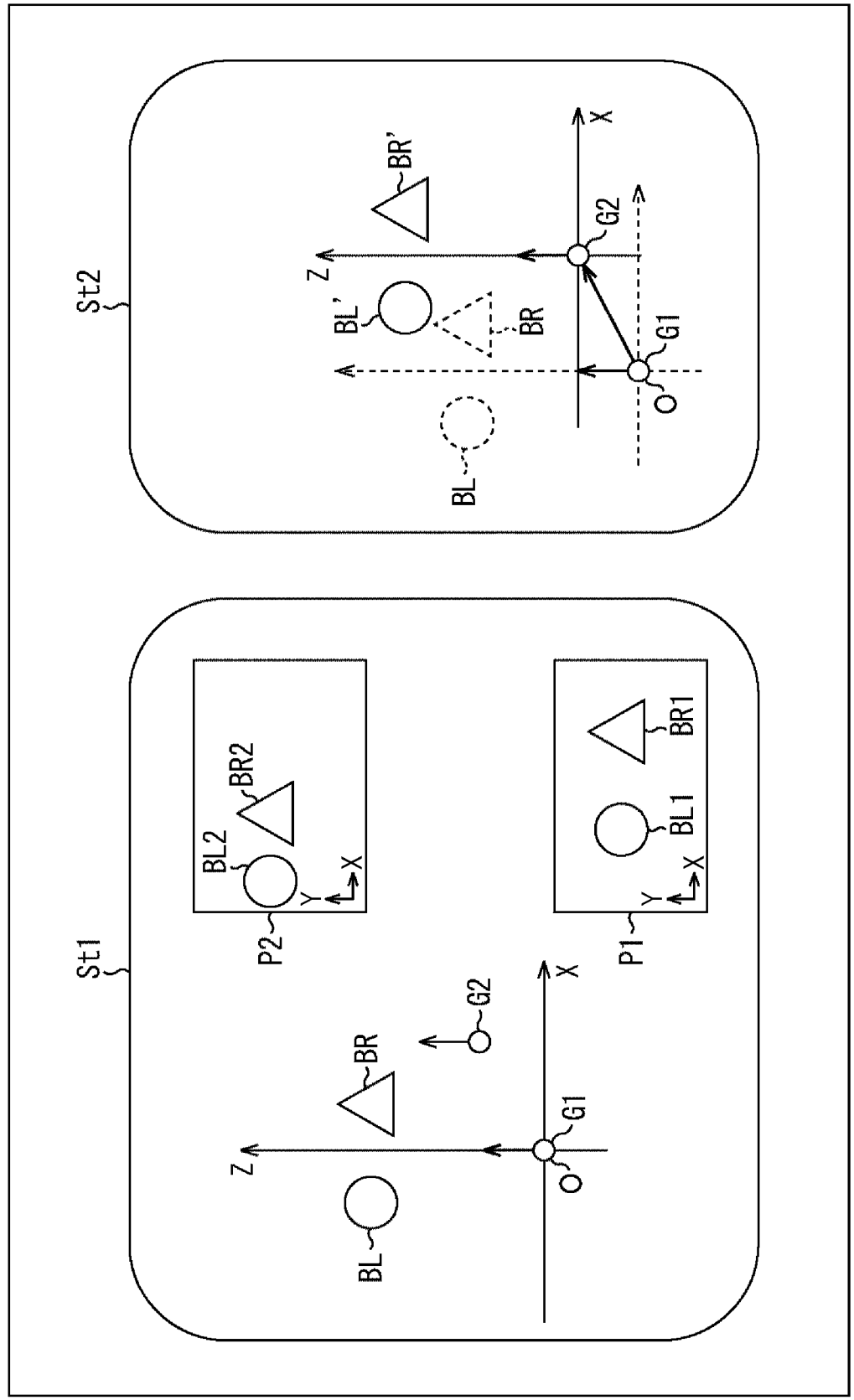
FIG. 3 is a diagram illustrating an example where an original point of the entire celestial image is moved to a viewing position.

For example, as illustrated in an example St1 in a left portion of FIG. 3, in a case where a viewing position and a viewing direction of the user wearing the HMD 11 in a predetermined space are an ideal viewing position G1 coincident with the original point position O, which is a position of the standard of the entire celestial image and an arrow direction in the drawing is the viewing direction, an image P1 in which predetermined objects BL and BR in the entire celestial image are arranged in an ideal state, is generated as the viewing image. In the image P1, image objects BL1 and BR1 corresponding to the objects BL and BR exist in the vicinity of substantially the center in the image P1.

Furthermore, in a distribution chart of a left portion in the example St1 of FIG. 3, an X axis represents a horizontal direction in the entire celestial image, and a Z axis represents a depth direction represented by the depth information. Therefore, a Y axis in the entire celestial image is a paper front direction in the drawing. That is, in the left portion of FIG. 3, a positional relationship between a viewing position at the time of seeing an image of a partial range represented by the entire celestial image from an upper side by standing an image plane in a vertical direction with respect to the paper in the drawing, and the positions of the objects BL and BR in the horizontal direction and the depth direction in the image with respect to the viewing position.

That is, in FIG. 3, when the original point position O, which is a standard position of the entire celestial image, is set to the viewing position G1, the image to be viewed is represented as the image P1. Furthermore, in the images P1 and P2, a horizontal direction is an X axis, and a vertical direction is a Y axis.

In contrast, in a case where the viewing position of the user is a viewing position G2 shifted in an upper right direction of the left portion of FIG. 3 from the original point O, and an arrow direction in the drawing is the viewing direction, the image P2 in which the predetermined objects BL and BR exist is generated as the viewing image. In the image P2, image objects BL2 and BR2 corresponding to the objects BL and BR exist close to a left end portion in the image P2.

That is, in the image P2, the image objects BL2 and BR2 are arranged by interpolation processing using the information of the objects BL and BR. For this reason, in a case where a positional shift between the original point O (=G1) and the viewing position G2 is less than a predetermined value, the influence of disparity disorder in the image is small, and in a case where the positional shift between the original point O (=G1) and the viewing position G2 is greater than the predetermined value, the disparity is greatly changed, and thus, there is a concern that the image collapses as the viewing image (the disparity image).

Therefore, in the HMD 11 of the present disclosure, in a case where the positional shift between the original point O (=G1) and the viewing position G2 is greater than the predetermined value, as illustrated in an example St2 of a right portion of FIG. 3, coordinate conversion is performed such that the viewing position G2 is the original point O in the entire celestial image. The coordinate conversion is performed, and thus, a positional relationship between the objects BL' and BR' in the viewing position G2 of the user is similar to a positional relationship between the objects BL and BR when the user is in the original point O (=G1), and thus, the ideal viewing image can be generated, and a collapse in the viewing image (the disparity image) is suppressed.

<Configuration Example of First Embodiment of HMD System of Present Disclosure>

Figure 4:
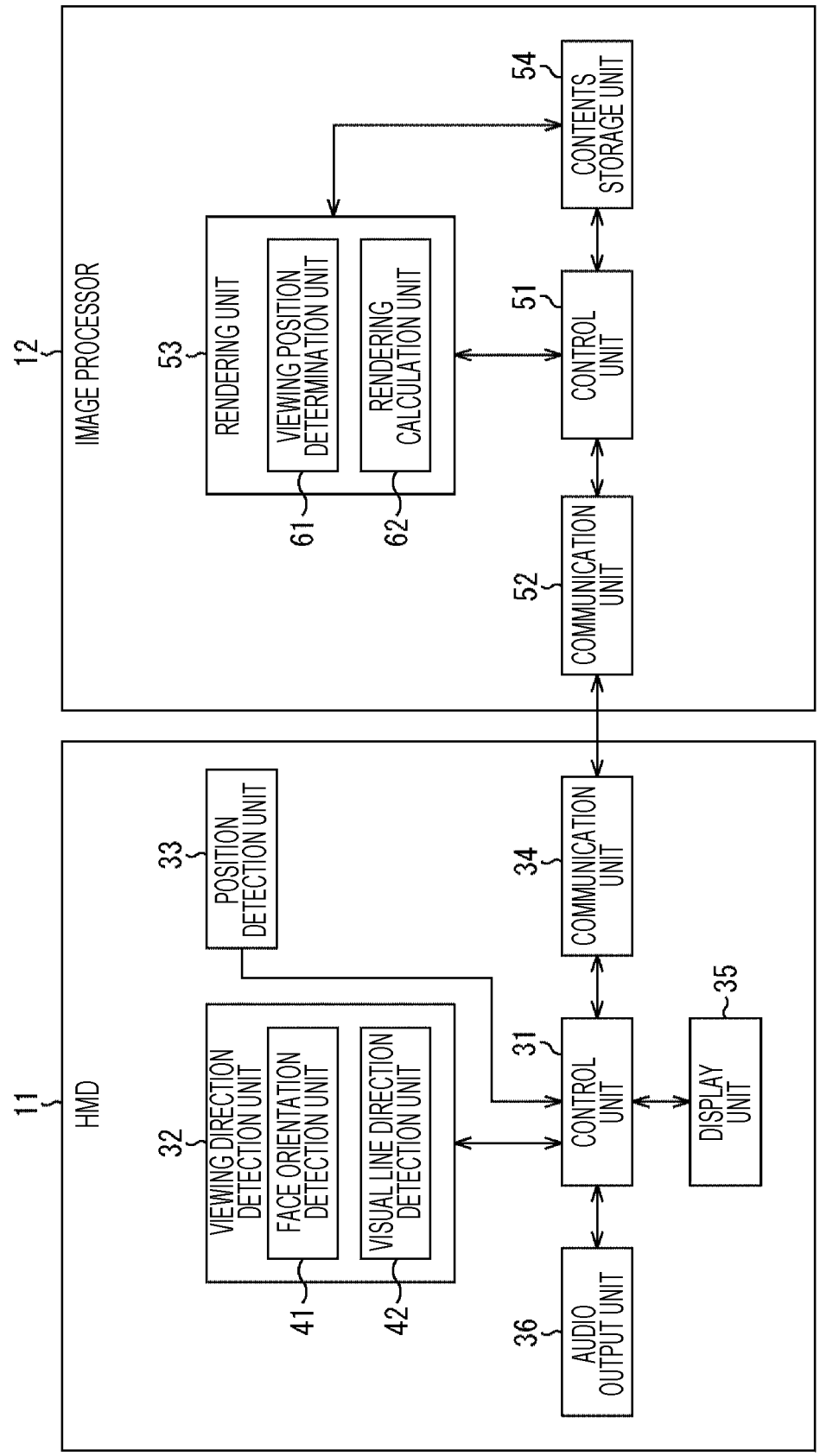
FIG. 4 is a block diagram illustrating a configuration example of a first embodiment of an HMD system according to the embodiment of the present disclosure.

FIG. 4 illustrates a configuration example of a first embodiment of an HMD system of the present disclosure. The HMD system of FIG. 4 includes the HMD 11 and an image processor 12.

As described with reference to FIG. 1 to FIG. 3, the HMD 11 is mounted on the head of the user, detects the position information, which is the position of the head of the user, and the viewing direction, and transmits the detected position information and the viewing direction to the image processor 12.

The image processor 12 stores the entire celestial image, interpolation-generates the image for a left eye and the image for a right eye, having a suitable disparity, corresponding to the position information and the viewing direction, transmitted from the HMD 11, from the entire celestial image, and transmits the images to the HMD 11.

The HMD 11 receives the image for a left eye and the image for a right eye, having a suitable disparity, corresponding to the position information and the viewing direction, transmitted from the image processor 12, and allows the user to view the images. Furthermore, hereinafter, the image for a left eye and the image for a right eye, having a corresponding suitable disparity, are also simply referred to as a disparity image, on the basis of the position information and the viewing direction, according to rendering using the entire celestial image.

According to such a configuration, the user wearing the HMD 11 is capable of viewing the entire celestial image having a suitable disparity, with the right and left eyes according to the face orientation direction and the visual line direction of the user, and is capable of enjoying the feeling of looking into the space represented by the entire celestial image.

More specifically, the HMD 11 includes a control unit 31, a viewing direction detection unit 32, a position detection unit 33, a communication unit 34, a display unit 35, and an audio output unit 36.

The control unit 31 controls the entire operation of the HMD 11.

The viewing direction detection unit 32 detects the viewing direction of the user (a viewer) wearing the HMD 11, and outputs the detected viewing direction to the control unit 31.

More specifically, the viewing direction detection unit 32 includes a face orientation detection unit 41 and a visual line direction detection unit 42, controls each of the face orientation detection unit 41 and the visual line direction detection unit 42 to detect the face orientation direction and the visual line direction, calculates the viewing direction from the detected face orientation direction and visual line direction, and outputs the calculated viewing direction to the control unit 31.

The face orientation detection unit 41, for example, includes a motion sensor or the like, and detects the face orientation direction of the user wearing the HMD 11. The face orientation direction, specifically, is a direction towards which the HMD 11 mounted to cover the user's eyes is directed, and for example, is a direction corresponding to the face orientation directions F11 and F21 of the users H1 and H2 in FIG. 2, respectively.

That is, the HMD 11 detects a front direction of the HMD 11, as the face orientation direction which is a direction directly facing the center of the face such as a frown of the user wearing the HMD 11. The face orientation direction, for example, is detected as an angle of the front direction of the HMD 11 with respect to a direction which is the standard such as a far north direction.

The visual line direction detection unit 42, for example, includes a camera or the like imaging the eyeballs of the user wearing the HMD 11, and detects the visual line direction on the basis of the motion of the eyeballs imaged by the camera. The visual line direction, for example, is the visual line directions E11 and E12 of the users H1 and H2 in FIG. 2, and detects the front direction of the HMD 11, that is, an angle of a direction towards which a visual line is directed, with respect to a standard direction such as the face orientation direction, as the visual line direction.

The viewing direction detection unit 32 calculates the viewing direction from the face orientation direction obtained by the face orientation detection unit 41, and the visual line direction obtained by the visual line direction detection unit 42. More specifically, the viewing direction detection unit 32 calculates the angle ($\theta1+\theta2$), which is the sum of an angle $\theta1$ and an angle $\theta2$, as the viewing direction of the user H2, from the angle $\theta1$ which is the face orientation direction F21 of the user H2 of FIG. 2, and the angle $\theta2$ which is the visual line direction E21, and outputs the calculated angle to the control unit 31.

The position detection unit 33 detects the position information of the HMD 11 as the position information of the user, and outputs the detected position information to the control unit 31. The position detection unit 33 may have any configuration as long as the position of the HMD 11 in the real space can be detected. That is, the position detection unit 33, for example, may include a global positioning system (GPS) or the like, and may detect the position information including a latitude and a longitude on the earth. In addition, the position detection unit 33 may include an imaging device imaging the periphery of the HMD 11, a calculation device, a direction detection device, and the like, the calculation device may store in advance position information of the peripheral object, and may calculate the position information of the HMD 11, from a positional relationship between an imaging direction of the imaging device and the peripheral object in the imaged image.

The control unit 31 controls the communication unit 34 performing communication using a wireless local area network (LAN), Bluetooth (Registered Trademark), or the like, combines the information of the viewing direction where the HMD 11 is mounted, which is input from the viewing direction detection unit 32 with the position information of the HMD 11, which is input from the position detection unit 33, and causes the communication unit 34 to transmit the combined information to the image processor 12.

In addition, the control unit 31 controls the communication unit 34, and receives the disparity image which is transmitted from the image processor 12 on the basis of the position information of the HMD 11 and the information of the viewing direction. At this time, audio data corresponding to the disparity image may be included.

Further, the control unit 31 displays the image for a left eye on the display unit 35 to be viewed with the left eye of the user wearing the HMD 11, and displays the image for a right eye on the display unit 35 to be viewed with the right eye of the user wearing the HMD 11. At this time, in a case where the audio data is included, the control unit 31 may output an audio from the audio output unit 36 such as a speaker or a headphone.

The display unit 35 includes an organic electro-luminescence (EL), a liquid crystal display (LCD), or the like, includes a display portion for a left eye (not illustrated) displaying the image for a left eye to be viewed with the left eye and a display portion for a right eye (not illustrated) displaying the image for a right eye to be viewed with the right eye, and displays the image for a left eye and the image for a right eye, configuring the disparity image supplied from the control unit 31, on the display portion for a left eye and the display portion for a right eye, respectively.

The user wears the HMD 11, views the image for a left eye displayed on the display portion for a left eye with the left eye, and views the image for a right eye displayed on the display portion for a right eye with the right eye, in the display unit 35, and thus, is capable of viewing a stereoscopic image according to a disparity between the image for a left eye and the image for a right eye. At this time, an image according to the motion of the HMD 11 mounted on the user is displayed, and thus, the user is capable of enjoying the feeling of looking into the space represented by the entire celestial image.

The image processor 12 includes a control unit 51, a communication unit 52, a rendering unit 53, and a contents storage unit 54.

The control unit 51 controls the entire operation of the image processor 12. In addition, the control unit 51 controls the communication unit 52 performing communication using a wireless local area network (LAN), Bluetooth (Registered Trademark), or the like, and causes the communication unit 52 to receive the position information of the HMD 11 and the information of the viewing direction, supplied from the HMD 11. The control unit 51 gives instruction such that the position information of the HMD 11 and the information of the viewing direction, received from the HMD 11, is output to the rendering unit 53, and the corresponding disparity image is generated.

The contents storage unit 54 stores the contents including the entire celestial image, and as necessary, supplies the contents to the rendering unit 53. In the contents storage unit 54, in a case where there are a plurality of contents including the stored entire celestial image, and the position information of the HMD 11 and the information of the viewing direction are included, the control unit 51 may combine the information designating the plurality of contents stored in advance in the contents storage unit 54, and output the combined information to the rendering unit 53.

The rendering unit 53 reads out data of the entire celestial image of the contents stored in the contents storage unit 54, generates the disparity image according to rendering, on the basis of the position information and the information of the viewing direction, supplied from the control unit 51, and outputs the generated disparity image to the control unit 51. In a case where the audio data is included in the contents, the rendering unit 53 also outputs the audio data to the control unit 51.

More specifically, the rendering unit 53 includes a viewing position determination unit 61 and a rendering calculation unit 62.

When the disparity image corresponding to the viewing position and the viewing direction, using the original point position (hereinafter, also referred to as the original point O) of the entire celestial image as the standard, is generated according to the rendering, the viewing position determination unit 61 determines whether there is a collapse in the generated disparity image on the basis of the position information of the user wearing the HMD 11, and supplies a determination result to the rendering calculation unit 62.

Figure 5:
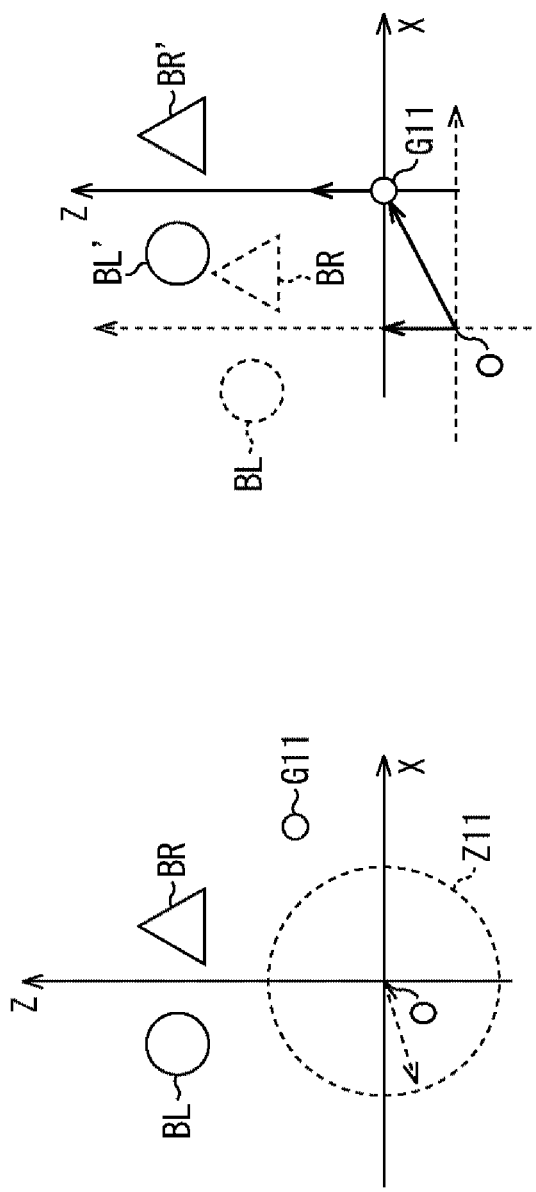
FIG. 5 is a diagram illustrating a method of determining the presence or absence of a collapse in a disparity image, and a method of suppressing the collapse.

More specifically, the viewing position determination unit 61 determines whether or not there is a collapse in the disparity image according to whether or not the viewing position of the user in the entire celestial image is within a range Z11 in a predetermined distance from the original point O represented by a dotted line in the drawing, with respect to the original point O, on the basis of the depth information of the entire celestial image, which is a subject distance in each pixel unit, as illustrated in a left portion of FIG. 5. Furthermore, the radius of the range Z11, for example, is set according to a condition such as an application program. Therefore, even in the same viewing position, the presence or absence of a collapse is different according to the application program.

For example, as illustrated in a viewing position G11 in the left portion of FIG. 5, in a case where the viewing position is out of the range Z11, it is considered that a collapse in the disparity image occurs.

On the other hand, for example, in a case where the viewing position is within the range Z11, it is considered that the disparity image having a suitable disparity can be interpolation-generated according to the rendering, and thus, it is considered that a collapse does not occur.

The rendering calculation unit 62 specifies the viewing position in the entire celestial image corresponding to the position information and the information of the viewing direction, on the basis of the determination result of the viewing position determination unit 61, generates the disparity image having a suitable disparity according to the rendering by using an image in a range of the entire celestial image at the time of seeing the viewing direction from the specified viewing position, and outputs the generated disparity image to the control unit 51.

More specifically, in a case where the determination result of the viewing position determination unit 61 is a result indicating that there is no collapse in the disparity image corresponding to the viewing position and the viewing direction with respect to the specified entire celestial image, the rendering calculation unit 62 specifies the viewing position corresponding to the coordinate system using the original point position of the entire celestial image (the original point O in FIG. 3) as the standard, on the basis of the position information, specifies the range of the entire celestial image at the time of seeing the viewing direction from the viewing position, interpolation-generates the disparity image in the specified range according to the rendering, and outputs the generated disparity image to the control unit 51.

On the other hand, in a case where the determination result of the viewing position determination unit 61, for example, is a result indicating that there is a collapse, the rendering calculation unit 62 shifts the viewing position specified on the basis of the position information to the original point position of the entire celestial image (the original point O in FIG. 3), specifies the range of the entire celestial image at the time of seeing the viewing direction, and generates the disparity image in the specified range according to the rendering.

As described above, in a case where it is determined that there is a collapse, as illustrated in a right portion of FIG. 5, the current viewing position G11 of the coordinate system in the entire celestial image is subjected to coordinate conversion to be coincident with the original point O in the entire celestial image.

According to such coordinate conversion, images at the time of seeing the viewing direction from the viewing position in the coordinate system of the entire celestial image can be ideally arranged as illustrated in the objects BL1 and BR1 in the image P1 of FIG. 3, a collapse can be prevented, and the disparity image including the image for a left eye and the image for a right eye, having a suitable disparity, can be generated according to the rendering.

<Display Processing of HMD System of FIG. 4>

Next, display processing of the HMD system of FIG. 4 will be described, with reference to a flowchart of FIG. 6.

In Step S11, the position detection unit 33 detects the position information of the HMD 11, and outputs the detected position information to the control unit 31.

In Step S12, the viewing direction detection unit 32 controls the visual line direction detection unit 42, and for example, causes the visual line direction detection unit 42 to detect the visual line direction of the user from an image obtained by imaging the eyeballs of the user wearing the HMD 11.

In Step S13, the viewing direction detection unit 32 controls the face orientation detection unit 41, and for example, causes the face orientation detection unit 41 to detect the face orientation direction of the user by detecting the direction of the HMD 11 mounted on the user, with a motion sensor or the like.

In Step S14, the viewing direction detection unit 32 calculates the viewing direction by using the detected visual line direction and the detected face orientation direction, and outputs the calculated viewing direction to the control unit 31.

In Step S15, the control unit 31 controls the communication unit 34, and causes the communication unit 34 to transmit the information of the viewing direction supplied from the viewing direction detection unit 32, and the information combined with the position information supplied from the position detection unit 33 to the image processor 12.

In Step S31, the communication unit 52 of the image processor 12 receives the position information of the HMD 11, and the information of the viewing direction, transmitted from the HMD 11, and outputs the received information to the control unit 51. The control unit 51 outputs the acquired position information of the HMD 11, and the acquired information of the viewing direction to the rendering unit 53.

In Step S32, the rendering unit 53 controls the viewing position determination unit 61, causes the viewing position determination unit 61 to obtain the viewing position in the entire celestial image, which is the contents corresponding to the position information according to the rendering of the rendering calculation unit 62, on the basis of the position information and the information of the viewing direction, and determines whether or not there is a collapse in the disparity image from the obtained viewing position.

That is, as described with reference to FIG. 5, the viewing position determination unit 61, for example, determines the presence or absence of a collapse on the basis of whether or not the viewing position, for example, is in the predetermined range Z11 from the original point O.

In Step S32, in a case where it is determined that there is a collapse, the processing proceeds to Step S33.

In Step S33, the rendering unit 53 performs coordinate conversion such that the original point O of the coordinate system in the entire celestial image, which is the contents, is shifted to the viewing position, with respect to the rendering calculation unit 62.

In Step S34, the rendering unit 53 controls the rendering calculation unit 62, and causes the rendering calculation unit 62 to read out the contents including the data of the entire celestial image from the contents storage unit 54.

In Step S35, the rendering unit 53 controls the rendering calculation unit 62, and causes the rendering calculation unit 62 to interpolation-generate the disparity image according to the rendering by using an image in a range at the time of seeing the viewing direction from the viewing position in the entire celestial image, which is the contents, and output the generated disparity image to the control unit 51.

In Step S36, the control unit 51 controls the communication unit 52, and causes the communication unit 52 to transmit the disparity image which is interpolation-generated according to the rendering, to the HMD 11.

Furthermore, in Step S32, in a case where it is determined that there is no collapse, the processing of Step S33 is skipped. That is, in a case where there is no collapse, the disparity image is interpolation-generated according to the rendering from an image specified with respect to the viewing direction from the viewing position in the coordinate system using the original point O in the original entire celestial image as the standard.

In Step S15, the control unit 31 controls the communication unit 34, and causes the communication unit 34 to receive the disparity image based on the viewing direction and the position information, transmitted from the image processor 12.

In Step S16, the control unit 31 displays the received disparity image on the display unit 35, and allows the user to view the image for a left eye and the image for a right eye with the left eye and the right eye of the user, respectively.

In Step S17, an operation unit (not illustrated) is operated, and thus, the control unit 31 determines whether or not the end of the processing is instructed.

In Step S17, in a case where the end is not instructed, the processing returns to Step S11, and the subsequent processings are repeated, and in a case where the end is instructed, the processing is ended.

In addition, in a case where the processing of Step S36 is ended, in Step S37, the control unit 51 determines whether or not the end is instructed, and in a case where it is not determined that the end is instructed, the processing returns to Step S31, and the subsequent processings are repeated. Then, in Step S37, the end of the processing is instructed, and the processing is ended.

According to the processings described above, in a case where it is determined that there is a collapse in the disparity image generated according to the rendering, on the basis of the viewing position in the entire celestial image, which is obtained according to the position information of the HMD 11, the coordinate conversion is performed such that the viewing position in the entire celestial image at the time of generating the disparity image is shifted to the original point position in the entire celestial image, and thus, it is possible to suppress a collapse in the disparity image.

In other words, in a case where the viewing position is within the predetermined range, the disparity image according to the viewing position is displayed, and in a case where the viewing position is out of the predetermined range, the disparity image of the original point position is displayed by being switched with the disparity image according to the viewing position. That is, in a case where the viewing position is within the predetermined range, the rendering unit 53 generates the disparity image according to the viewing position (a normal disparity image), as a first mode, and in a case where the viewing position is out of the predetermined range, generates the disparity image of the original point position but not of the viewing position, as a second mode. As a result thereof, the disparity image is generated by switching the modes according to the viewing position, and thus, it is possible to suppress a collapse in the disparity image.

2. Second Embodiment

In the above description, an example has been described in which when the disparity image is generated, the presence or absence of a collapse in the disparity image to be interpolation-generated is determined on the basis of the viewing position in the entire celestial image corresponding to the position information of the HMD 11, and in a case where it is considered that there is a collapse, the viewing position in the entire celestial image based on the position information is shifted to the original point O, and thus, a collapse in the disparity image is suppressed.

However, in a case where the viewing position in the entire celestial image is immediately shifted to the original point position at a timing when it is determined that there is a collapse in the disparity image, on the basis of the position information of the HMD 11 and the information of the viewing direction of the user, and the disparity image having no collapse is generated immediately before the timing, the viewing position in the entire celestial image is rapidly changed, and thus, there is a possibility that so-called sickness according to the viewing of the stereoscopic image is induced.

Therefore, instead of immediately shifting the viewing position in the entire celestial image to the original point position at a timing where it is determined that there is a collapse in the disparity image, on the basis of the position information of the HMD 11 and the information of the viewing direction of the user, the coordinate conversion of shifting the viewing position in the entire celestial image to the original point position may be performed at a timing when the viewing of the stereoscopic image by the user is factually temporarily interrupted, for example, when the user blinks.

Figure 7:
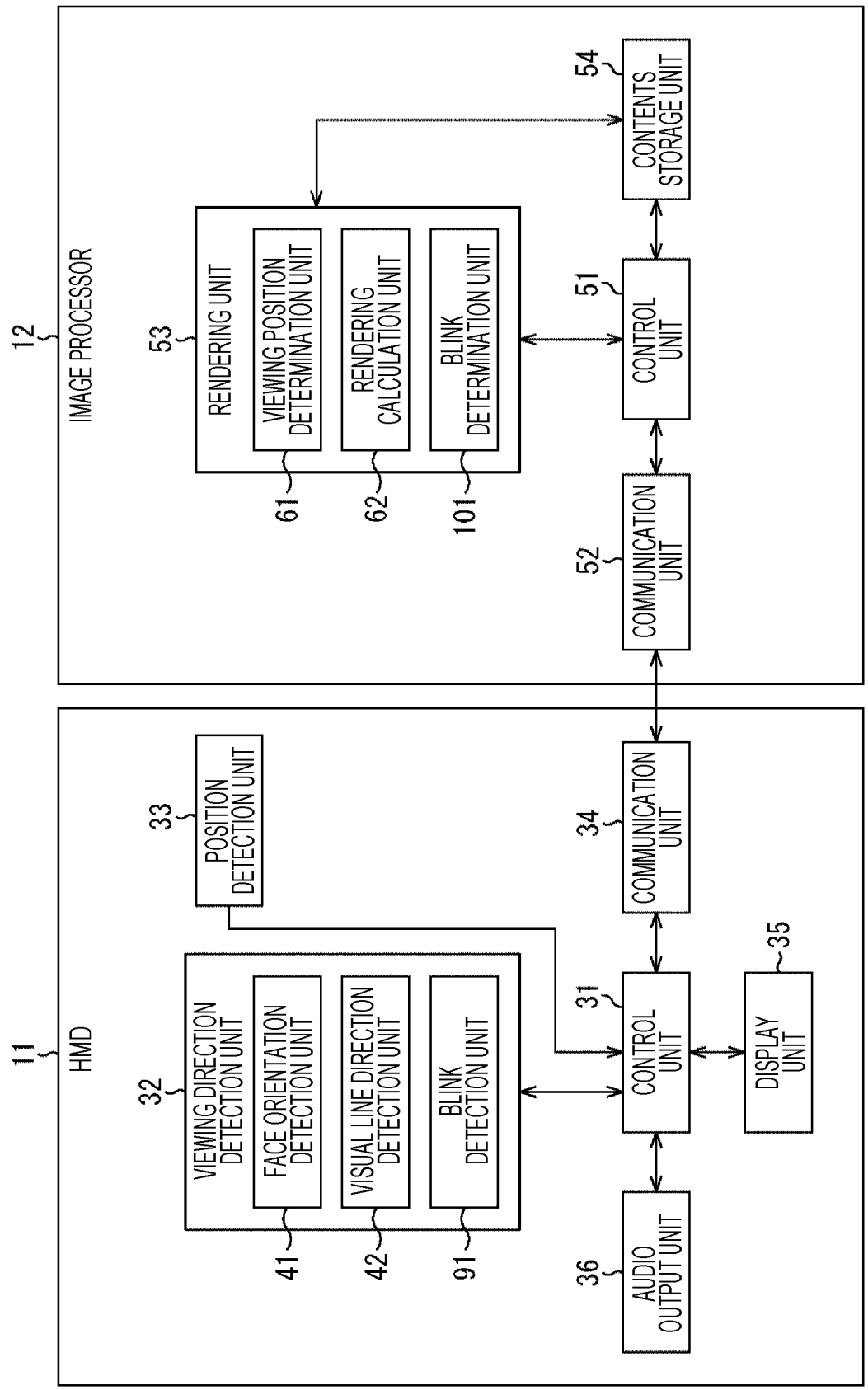
FIG. 7 is a block diagram illustrating a configuration example of a second embodiment of the HMD system according to the embodiment of the present disclosure.

FIG. 7 illustrates a configuration example of an HMD system in which in a case where it is determined that there is a collapse in the disparity image, the coordinate conversion of shifting the viewing position in the entire celestial image to the original point position is performed only at a timing when the viewing of the stereoscopic image by the user is temporarily interrupted, for example, when the user blinks.

In the HMD system of FIG. 7, the same reference numerals are applied to configurations having the same function as that of the configurations of the HMD system of FIG. 4, and the description thereof will be suitably omitted.

That is, the HMD system of FIG. 7 differs from the HMD system of FIG. 4 in that a blink detection unit 91 detecting the blink of the user is provided in the viewing direction detection unit 32 of the HMD 11, and a blink determination unit 101 is provided in the rendering unit 53 of the image processor 12.

The blink detection unit 91 in the viewing direction detection unit 32 of the HMD 11, for example, detects the presence or absence of the blink by using the image of the eyeballs of the user, which is used in the visual line direction detection unit 42, and outputs a detection result to the control unit 31. The control unit 31 controls the communication unit 34 and causes communication unit 34 to transmit the information of the presence or absence of the blink to the image processor 12, along with the position information and the information of the viewing direction.

The blink determination unit 101 in the rendering unit 53 of the image processor 12 determines the presence or absence of the blink, on the basis of the information of the presence or absence of the blink, which is transmitted from the HMD 11, and outputs the determination result to the rendering calculation unit 62.

Even in a case where it is determined that there is a collapse in the disparity image at the time of generating the disparity image, the rendering calculation unit 62 does not move the viewing position in the entire celestial image to the original point O, but generates the disparity image according to the rendering, at a timing when the blink is not detected. That is, in such a case, a possibility that the disparity image collapses is high, but it is possible to prevent sickness due to a rapid change in the viewing position from occurring.

On the other hand, in a case where it is determined that there is a collapse in the disparity image at the time of generating the disparity image, the rendering calculation unit 62 moves the viewing point in the entire celestial image to the original point position (the original point O), and generates the disparity image according to the rendering, at a timing when the blink is detected. That is, in such a case, the viewing of the stereoscopic image is temporarily interrupted at a timing when the blink is detected, and then, the viewing position is changed, and thus, it is possible to suppress a collapse in the disparity image while preventing the sickness due to the viewing of the stereoscopic image from occurring.

<Display Processing of HMD System of FIG. 7>

Next, display processing of the HMD system of FIG. 7 will be described with reference to a flowchart of FIG. 8.

Figure 6:
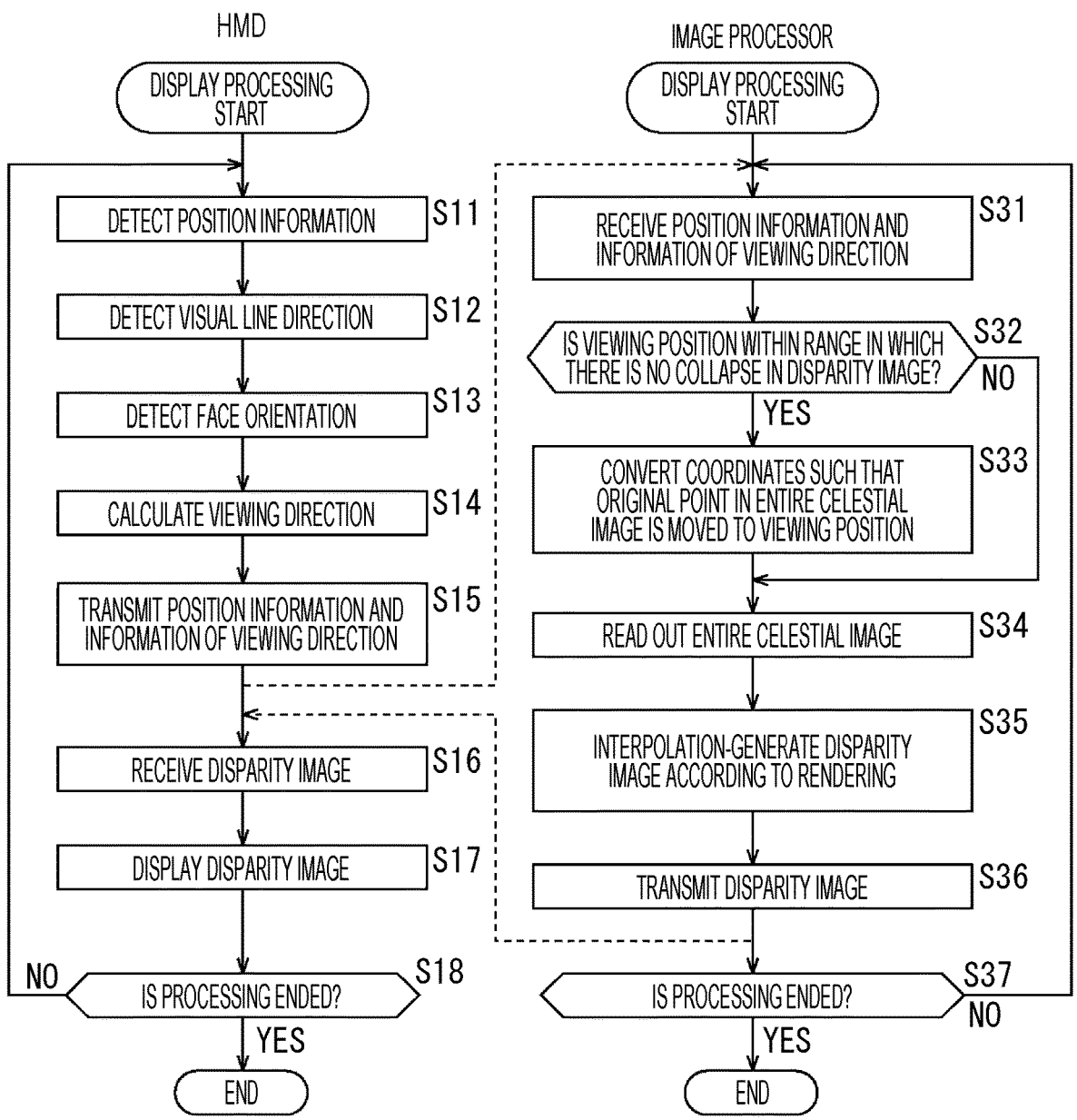
FIG. 6 is a flowchart illustrating display processing of the HMD system of FIG. 4.
Figure 8:
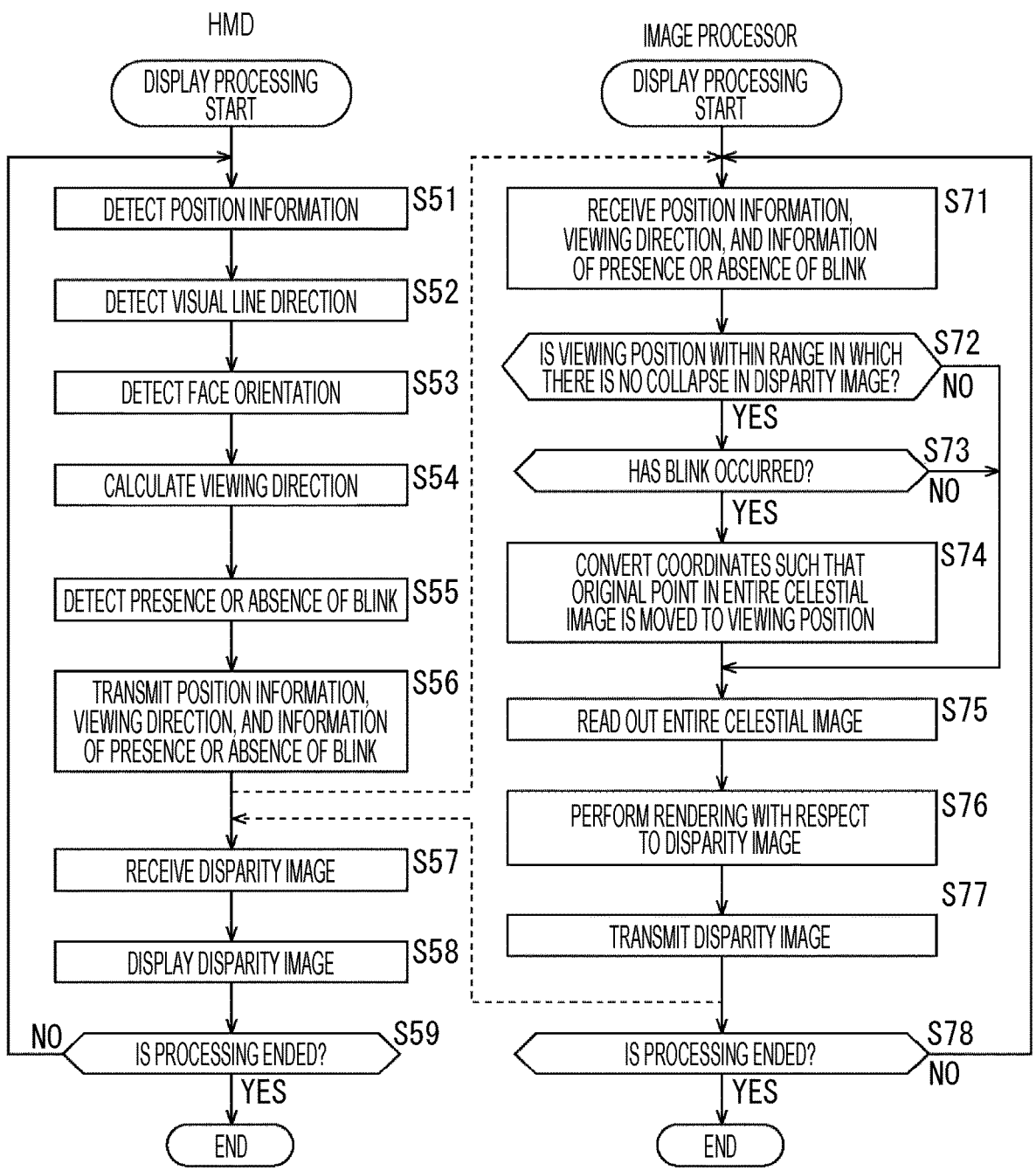
FIG. 8 is a flowchart illustrating display processing of the HMD system of FIG. 7.

Furthermore, the processings of Steps S51 to S54, and S57 to S59, and the processings of Steps S71, S72, and S74 to S78 in the flowchart of FIG. 8, are similar to the processings of Steps S11 to S14, and S16 to S18, and the processings of Steps S31 to S37 in the flowchart of FIG. 6, and the description thereof will be omitted.

That is, in Step S55, the blink detection unit 91 detects the presence or absence of the blink, on the basis of the image of the eyeballs imaged in order to detect the visual line direction in the visual line direction detection unit 42, and outputs a detection result to the control unit 31.

In Step S56, the control unit 31 controls the communication unit 34 and causes the communication unit 34 to transmit information in which the information of the viewing direction supplied from the viewing direction detection unit 32, the position information supplied from the position detection unit 33, and the information of the presence or absence of the blink supplied from the blink detection unit 91 are combined, to the image processor 12.

In addition, in Step S72, in a case where the viewing position in the entire celestial image specified on the basis of the position information is out of a predetermined range, and it is considered that there is a collapse in the disparity image, in Step S73, the blink determination unit 101 determines the presence or absence of the blink.

In Step S73, in a case where it is determined that the blink is detected, the processing proceeds to Step S74.

In Step S74, the rendering calculation unit 62 performs the coordinate conversion such that the viewing position based on the position information is shifted to the original point O in the entire celestial image.

In addition, in Step S73, in a case where it is considered that the blink is not detected, the processing of Step S74 is skipped, and the disparity image is generated by an image in a range specified at the time of seeing the viewing direction in the viewing position without shifting the viewing position to the original point O.

According to the processing described above, even in a case where there is a collapse in the disparity image to be interpolation-generated according to the rendering, according to the viewing position in the entire celestial image, the viewing position is shifted to the original point O, and the disparity image is interpolation-generated according to the rendering, only at a timing when the blink is detected, and thus, only when the user blinks, it is possible to interpolation-generate the disparity image in which the viewing position is switched to the original point O, and to prevent sickness due to a rapid change in the viewing position in the viewing of the stereoscopic image from occurring.

In other words, in a case where the viewing position is within the predetermined range or there is no blink, the disparity image according to the viewing position is displayed, and in a case where the viewing position is out of the predetermined range and there is a blink, the disparity image of the original point position is displayed by being switched with the disparity image of the viewing position. That is, in a case where the viewing position is within the predetermined range or there is no blink, the rendering unit 53 generates the disparity image according to the viewing position (the normal disparity image), as a first mode, and in a case where the viewing position is out of the predetermined range and there is a blink, generates the disparity image of the original point position but not the disparity image of the viewing position, as a second mode. As a result thereof, the disparity image is generated by switching the modes according to the viewing position and the presence or absence of the blink, and thus, it is possible to prevent a collapse in the disparity image or the sickness due to the viewing of the stereoscopic image from occurring.

Furthermore, in the above description, an example has been described in which the viewing position is shifted to the original point O at a timing when the disparity image collapses, and the blink is detected, but the other timing may be used insofar as being a timing when the viewing of the entire celestial image of the user is temporarily interrupted, and for example, the timing may be a timing when the user suddenly and widely turns around, a timing when the user widely shakes his neck up and down, or the like.

3. Third Embodiment

In the above description, an example has been described in which the coordinate conversion is performed such that the viewing position is shifted to the original point, according to the determination result of whether or not there is a collapse in the disparity image on the basis of whether or not the viewing position in the entire celestial image based on the position information, is within the predetermined range, and the presence or absence of the blink, and thus, the collapse in the disparity image is suppressed, and the occurrence of the sickness due to the viewing of the stereoscopic image is suppressed.

Figure 9:
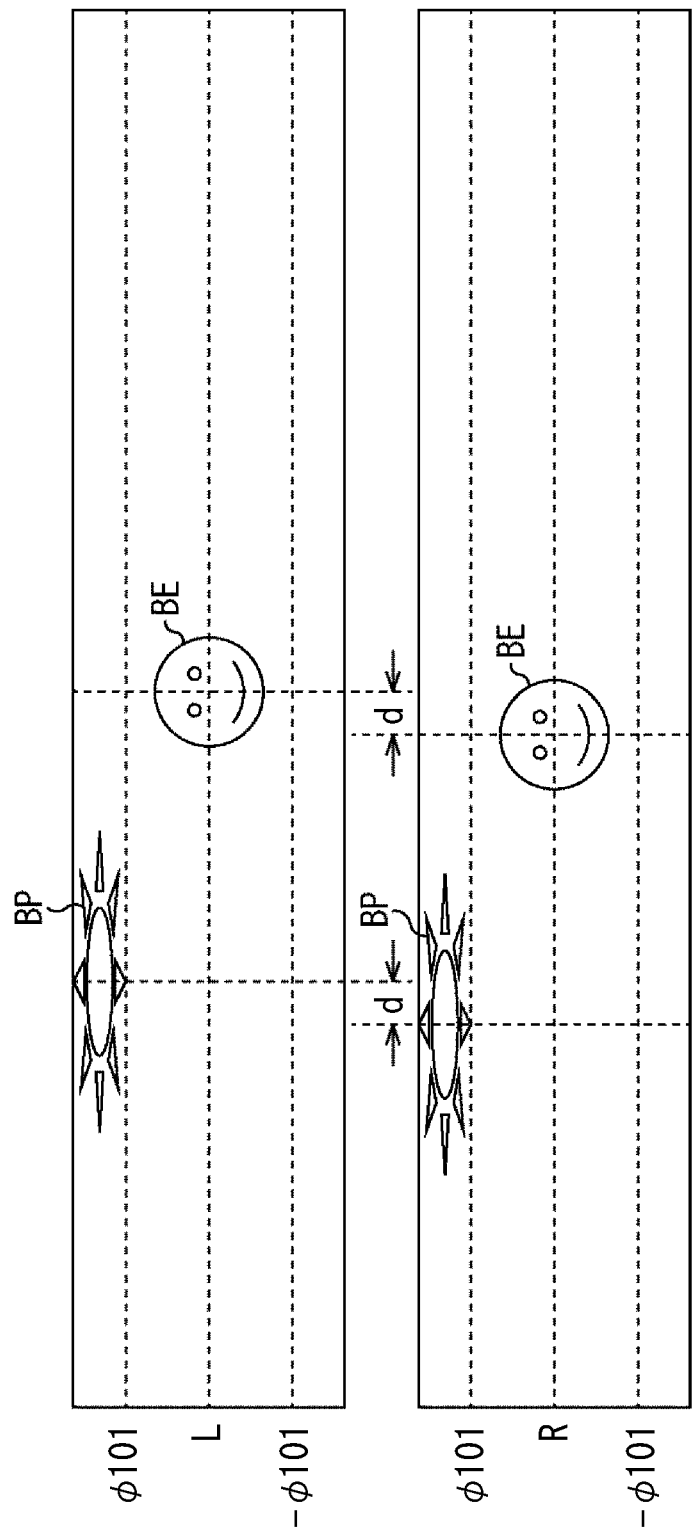
FIG. 9 is a diagram illustrating an equidistant cylindrical image configuring the entire celestial image.

However, in general, an image imaged by setting an elevation angle to be constant as 0 degrees, and by changing an azimuthal angle from 0 degrees to 360 degrees is usually used as the entire celestial image. In this case, the entire celestial image, for example, is an image as illustrated in FIG. 9. In FIG. 9, an upper side in the drawing is an equidistant cylindrical image L of the image for a left eye, and a lower side in the drawing is an equidistant cylindrical image R of the image for a right eye. In each of the images, a position in the vertical direction indicates the elevation angle, a position in the horizontal direction indicates the azimuthal angle.

In addition, the equidistant cylindrical images L and R include the same objects BP and BE, respectively. Among them, the object BE is displayed in the vicinity of a portion where the elevation angle is 0 degrees, and the object BP is displayed in the vicinity of a portion where the elevation angle is 90 degrees.

Further, a shift d in the objects BP and BE of the equidistant cylindrical images L and R is provided so as to generate a disparity.

However, the image in the position close to the portion where the elevation angle is 90 degrees easily collapses, and thus, even in a case where the shift d is provided, the disparity image is generated, and there is a concern that a collapse occurs.

Figure 10:
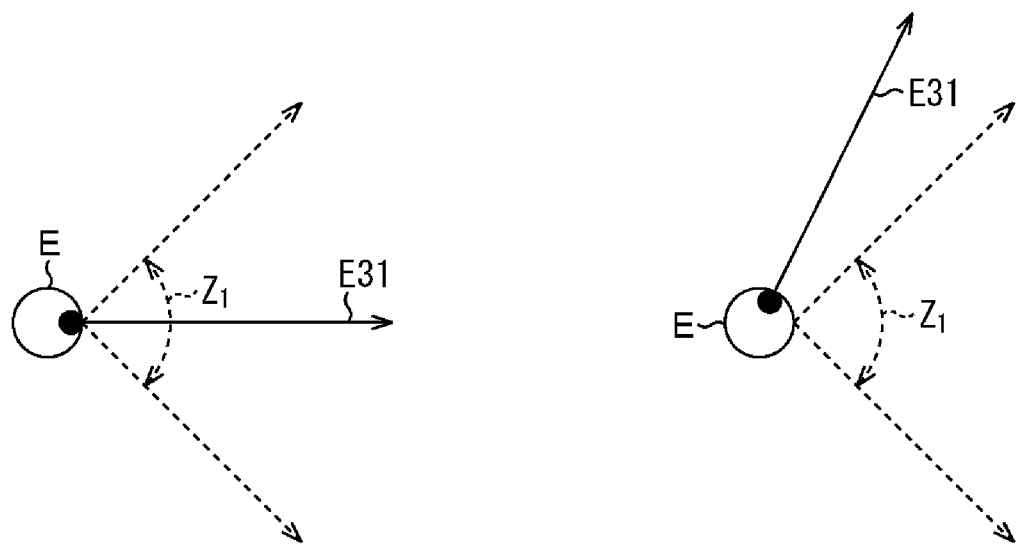
FIG. 10 is a diagram illustrating the presence or absence of the collapse in the disparity image according to a viewing direction.

Therefore, as illustrated in a left portion of FIG. 10, in a case where an elevation angle of a viewing direction E31 using eyes E of the user who is the viewer as the standard, that is, the elevation angle of the viewing direction E31 using the horizontal direction, which is an imaging direction of an imaging device imaging the entire celestial image, as the standard, for example, is within a predetermined range Z1 including the horizontal direction, it can be considered that there is no collapse in the disparity image.

In addition, as illustrated in a right portion of FIG. 10, in a case where an elevation angle of a viewing direction E31 using the eyes E of the user who is the viewer, as the standard, that is, the elevation angle of the viewing direction E31 using the horizontal direction, which is the imaging direction of the imaging device imaging the entire celestial image, as the standard, is out of the predetermined range Z1, it can be considered that there is a collapse in the disparity image.

Therefore, regarding the elevation angle with respect to the entire celestial image of the viewing direction, the viewing position determination unit 61 considers that there is no collapse when the viewing direction E31 is within the range Z1 including the horizontal direction, and considers that there is a collapse when the viewing direction E31 is out of the range Z1.

Figure 11:
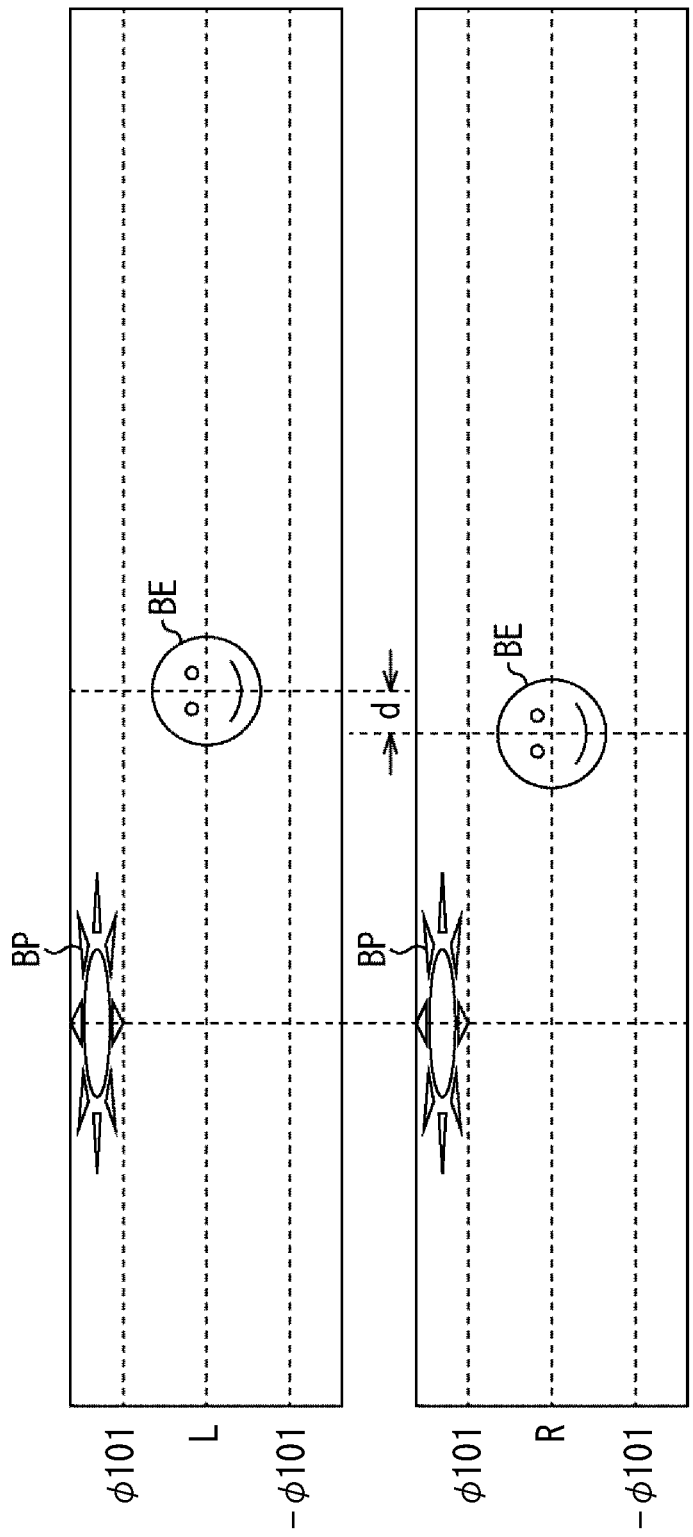
FIG. 11 is a diagram illustrating an equidistant cylindrical image in the case of not providing a disparity in an image only in the vicinity of a portion where an elevation angle is 90, in a case where the disparity image collapses.

For example, in a case where the predetermined range Z1 of FIG. 10 is a range of elevation angles $-\phi 101$ to $\phi 101$ of FIG. 9, it is considered that there is no collapse in the disparity image. Therefore, in a case where there is no concern of a collapse in the disparity image, as illustrated in FIG. 11, in order to generate the disparity image, the shift d is provided in the object BE of each of the equidistant cylindrical images L and R so as to generate the disparity image.

In addition, for example, as illustrated in the right portion of FIG. 10, when the viewing direction E31 is out of the predetermined range Z1, that is, the viewing direction is out of the range of the elevation angles of $-\phi 101$ to $\phi 101$, it is considered that there is a collapse in the disparity image. Therefore, in a case where there is a concern of a collapse in the disparity image, the shift d is not provided in the object BP of each of the equidistant cylindrical images L and R so as to generate an image having no disparity.

Thus, in a case where the elevation angle of the viewing direction is small, and there is no collapse in the disparity image, the shift d is provided, and thus, the disparity image having a suitable disparity is generated. In addition, in a case where the elevation angle of the viewing direction is wide up and down, and there is a collapse in the disparity image, the shift d is not provided, and the image having no disparity is generated, and thus, the occurrence of the collapse in the disparity image may be suppressed, and the occurrence of the sickness due to the viewing of the stereoscopic image may be suppressed.

<Configuration Example of HMD System of Third Embodiment>

Figure 12:
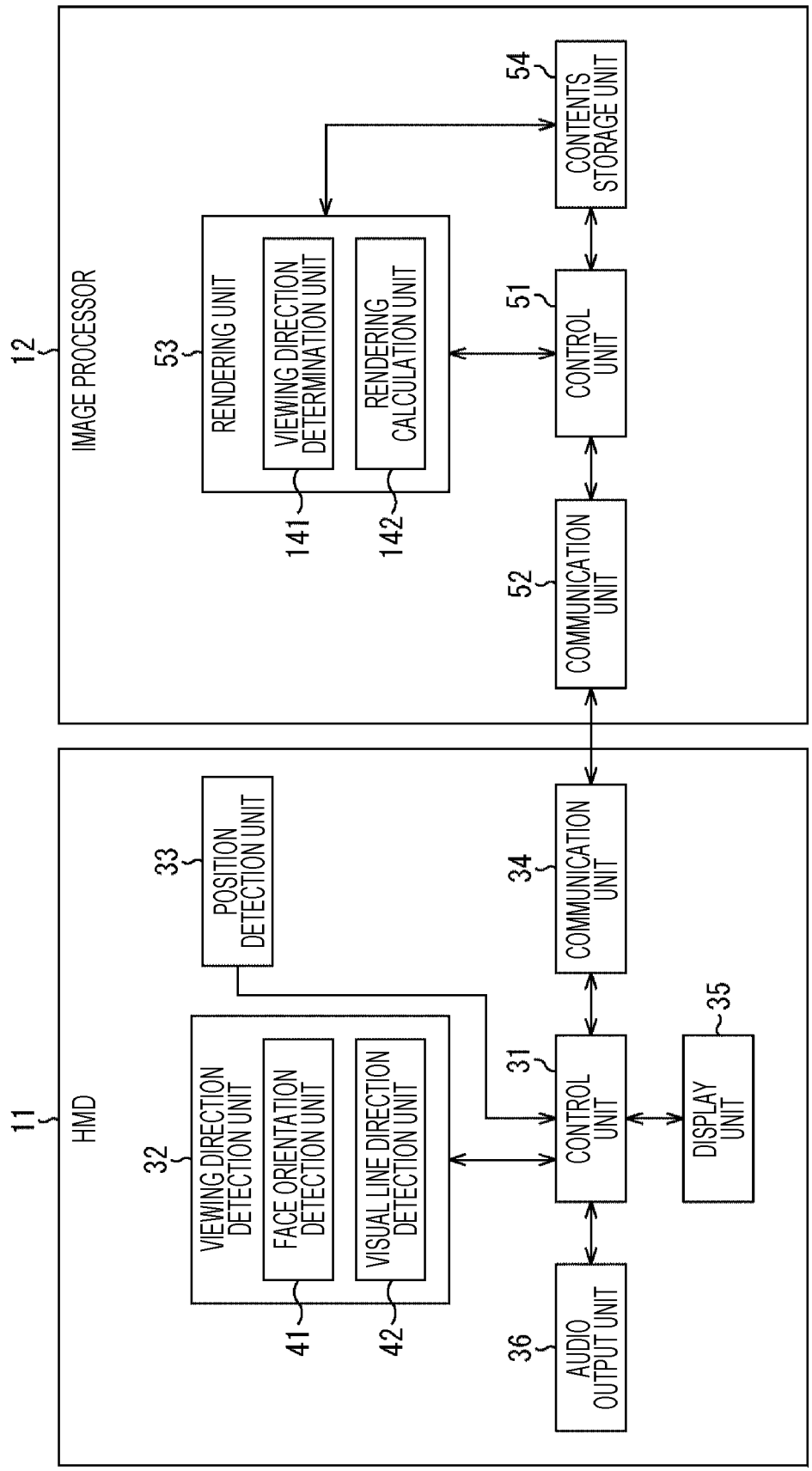
FIG. 12 is a block diagram illustrating configuration example of a third embodiment of the HMD system according to the embodiment of the present disclosure.

FIG. 12 illustrates a configuration example of an HMD system in which in a case where the elevation angle is wide, and there is a collapse in the disparity image, according to the elevation angle of the viewing direction, the image having no disparity is generated. Furthermore, in the HMD system of FIG. 12, the same reference numerals are applied to configurations having a similar function to that of the configurations of the HMD system of FIG. 4, and the description thereof will be suitably omitted.

That is, the HMD system of FIG. 12 differs from the HMD system of FIG. 4 in that a viewing direction determination unit 141 and a rendering calculation unit 142 are provided instead of the viewing position determination unit 61 and the rendering calculation unit 62.

The viewing direction determination unit 141 determines the presence or absence of a collapse in the disparity image on the basis of whether or not the elevation angle of the viewing direction is an elevation angle wider than the predetermined range Z1 ($-\phi 101$ to $\phi 101$ of FIG. 11), on the basis of the viewing direction, and supplies a determination result to the rendering calculation unit 142.

The rendering calculation unit 142 basically has a function similar to that of the rendering calculation unit 62, and in a case where there is no collapse in the disparity image, on the basis of the viewing direction determination unit 141, the disparity image is generated according to the same function as that of the rendering calculation unit 62. In addition, in a case where it is considered that there is a collapse in the disparity image as the determination result of the viewing direction determination unit 141, the rendering calculation unit 142 interpolation-generates the image for a left eye and the image for a right eye according to the rendering, as the same image having no disparity.

<Display Processing of HMD System of FIG. 12>

Figure 13:
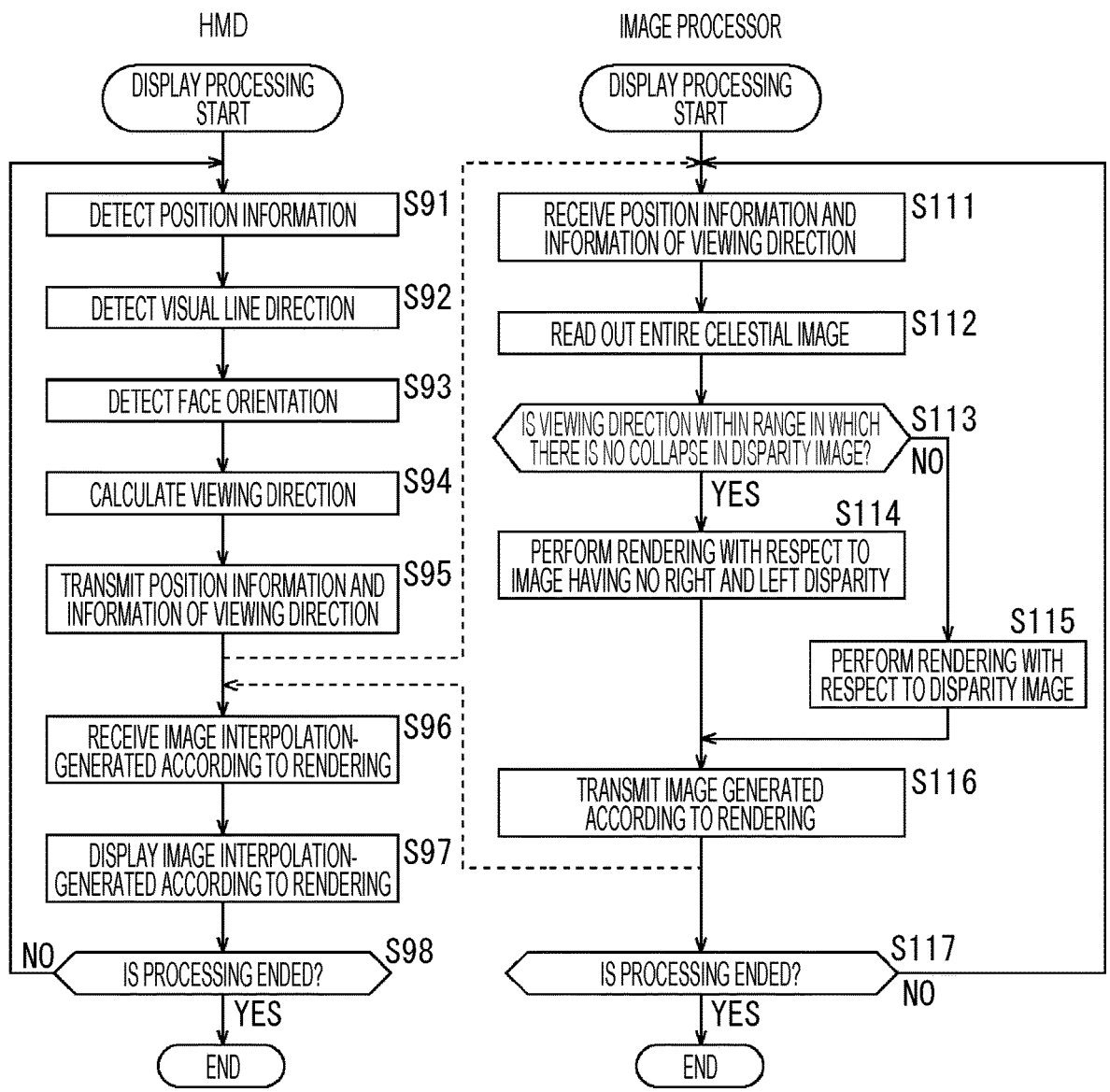
FIG. 13 is a diagram illustrating display processing of the HMD system of FIG. 12.

Next, display processing of the HMD system of FIG. 12 will be described with reference to a flowchart of FIG. 13. Furthermore, the processings of Steps S91 to S98, and processings of Steps S111, and S115 to S117 in the flowchart of FIG. 13, are similar to the processings of Steps S11 to S18, and processings of Steps S31, and S35 to S37 in FIG. 6, and thus, the description thereof will be omitted.

That is, in Step S112, the rendering calculation unit 142 reads out the data of the contents including the entire celestial image, which is stored in the contents storage unit 54.

In Step S113, the viewing direction determination unit 141 determines the presence or absence of a collapse in the disparity image on the basis of whether or not the elevation angle of the viewing direction is an elevation angle wider than the predetermined range Z1 (−ϕ101 to ϕ101).

In Step S113, in a case where it is determined that the elevation angle of the viewing direction is wider than the predetermined range Z1 (−ϕ101 to ϕ101), and there is a collapse in the disparity image, the processing proceeds to Step S114.

In Step S114, the rendering calculation unit 142 specifies the viewing position in the entire celestial image and the range of the image in the viewing direction in the viewing position, on the basis of the position information and the information of the viewing direction, and interpolation-generates the image for a left eye and the image for a right eye, having no disparity, according to the rendering.

On the other hand, in Step S113, in a case where it is determined that the elevation angle of the viewing direction is within the predetermined range, and there is no collapse in the disparity image, the processing proceeds to Step S115, and the rendering calculation unit 142 specifies the viewing position in the entire celestial image and the range of the image at the time of seeing the viewing direction from the viewing position, on the basis of the position information and the information of the viewing direction, and interpolation-generates the disparity image according to the rendering.

According to the processings described above, in a case where the elevation angle of the viewing direction is close to 90 degrees in an up-down direction, it is considered that there is a collapse in the disparity image, and the image for a left eye and the image for a right eye, having no disparity, are generated, and in a case where the elevation angle of the viewing direction is close to 0 degrees, it is considered that there is no collapse in the disparity image, and the disparity image is generated.

In other words, in a case where the elevation angle of the viewing direction is close to 0 degrees in the up-down direction, the disparity image according to the viewing position is displayed, and in a case where the elevation angle of the viewing direction is close to 90 degrees in the up-down direction, the right and left image having no disparity is switched and displayed. That is, in a case where the elevation angle of the viewing direction is close to 0 degrees in the up-down direction, the rendering unit 53 generates the disparity image according to the viewing position (the normal disparity image), as a first mode, and in a case where the elevation angle of the viewing direction is close to 90 degrees in the up-down direction, generates the right and left images having no disparity, as a second mode.

As a result thereof, the modes of generating the disparity image according to the elevation angle of the viewing direction are switched, and thus, it is possible to interpolation-generate the disparity image having no collapse according to the rendering, according to the elevation angle of the viewing direction, and to suppress the occurrence of the sickness due to the viewing of the stereoscopic image.

4. Modification Example of Third Embodiment

In the entire celestial image, in a case where the elevation angle in the equidistant cylindrical image is out of the range of −ϕ101 to ϕ101, that is, the same image having no disparity is used as the image for a left eye and the image for a right eye of the disparity image in which the elevation angle is in a range close to 90 degrees.

Figure 14:
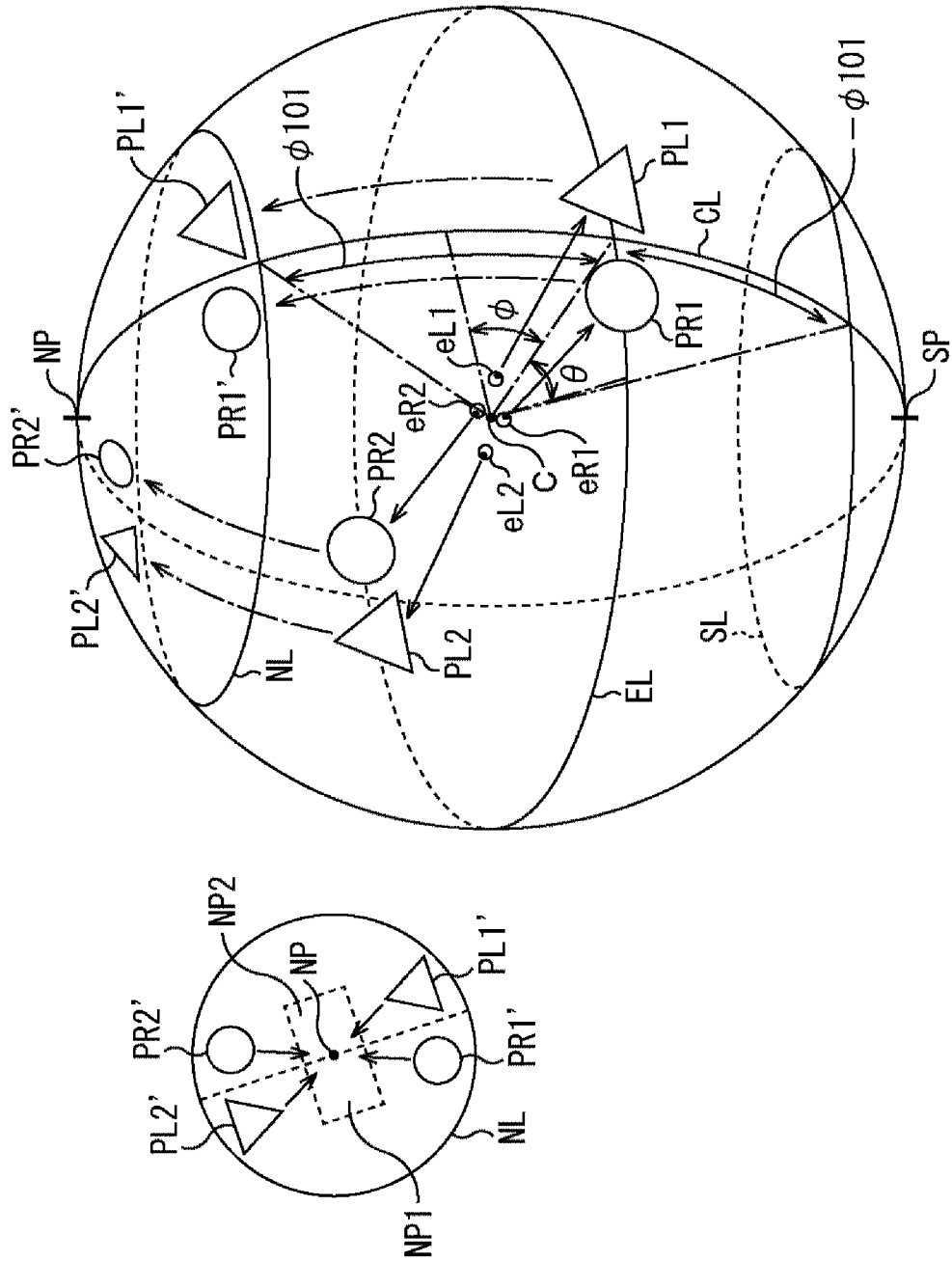
FIG. 14 is a diagram illustrating a modification example of the HMD system of FIG. 12.

That is, as illustrated in a right portion of FIG. 14, in a range of tropics NL to SL where an elevation angle ϕ of the viewing direction is in the range of −ϕ101 to ϕ101, there is no collapse in the disparity image, and the disparity image is generated in which the shift d is provided by the object BE in each of the equidistant cylindrical images L and R of FIG. 9.

Furthermore, in FIG. 14, an example is illustrated in which the entire celestial image is formed in a sphere.

In addition, the elevation angle ϕ of the viewing direction is out of the range of −ϕ101 to ϕ101, that is, the elevation angle is close to 90 degrees from the tropic NL of FIG. 14, and for example, one circular image as illustrated in a left portion of FIG. 14, is used in a range to a pole NP, and the disparity image is generated by using the one image. Furthermore, hereinafter, an image of a range in the vicinity of a vertex NP from the tropic NL will also be referred to as a polar image NP. In addition, the elevation angle is close to 90 degrees from the tropic SL, and similarly, one image is used in a range to a pole SP.

Here, it is considered that an image PL1 (a triangle in the drawing) and an image PR1 (a circle in the drawing) on a circumference EL in the vicinity of a portion where the elevation angle is 0 degrees are interpolation-generated as the image for a left eye and the image for a right eye of the disparity image, which are viewed from viewing points eL1 and eR1. At this time, as illustrated by an arrow of a dot-and-dash line, the elevation angle of the viewing direction from the viewing points eL1 and eR1 are moved to gradually increase to 90 degrees.

Similarly, it is considered that the images PL1 and PR1 are provided on opposite sides of which an azimuthal angle is approximately 180 degrees, the images PL2 and PR2 are provided in the vicinity of a portion in which the elevation angle is 0 degrees, and the images are interpolation-generated as the disparity image of the image for a left eye and the image for a right eye of the disparity image, which are viewed from viewing points eL2 and eR2. At this time, it is considered that the elevation angle of the viewing direction from the viewing points eL2 and eR2 illustrated by a dot-and-dash line is moved to gradually increase to 90 degrees.

Then, as illustrated in the left portion of FIG. 14, in the polar image NP, in a case where the elevation angle of the viewing direction from the viewing points eL1 and eR1 comes close to 90 degrees, in the polar image NP, the disparity image is generated as images PR1' and PL1'. On the other hand, in the polar image NP, in a case where the elevation angle of the viewing direction from the viewing points eL2 and eR2 comes close to 90 degrees, in the polar image NP, the disparity image is generated as images PR2' and PL2'.

Then, in a case where the viewing direction is 90 degrees, the disparity image based on the viewing direction from the viewing points eL1 and eR1, and the both of the image for a left eye and the image for a right eye configuring the disparity image based on the viewing direction from the viewing points eL2 and eR2 are the images NP1 and NP2, and may be the same. However, in both of the disparity images, the right and the left of the disparity image are different.

Therefore, in the case of a range where the elevation angle of the viewing direction is close to 90 degrees from the tropic NL, that is, in a case where the polar image NP is used for interpolation-generating of the disparity image, the rendering calculation unit 142 may exchange the right and left disparity images according to the motion of the viewing direction.

In other words, in a case where the motion of the viewing direction is a first motion, the disparity image including the image for a left eye including a first image and the image for a right eye including a second image is displayed, and in a case where the motion of the viewing direction is a second motion, the disparity image including the image for a left eye including the second image and the image for a right eye including the first image is displayed. That is, in a case where the motion of the viewing direction is the first motion, the rendering unit 53 generates the disparity image including the image for a left eye including the first image and the image for a right eye including the second image, as a first derivation mode in the second mode described above, and in a case where the motion of the viewing direction is the second motion, generates the disparity image including the image for a left eye including the second image and the image for a right eye including the first image, as a second derivation mode in the second mode described above. As a result thereof, the mode of generating the disparity image is switched to exchange the image for a left eye and the image for a right eye according to the motion of the viewing direction, and thus, it is possible to suppress a collapse in the disparity image or the sickness due to the viewing of the stereoscopic image.

Furthermore, in the above description, an example has been described in which the image for a left eye and the image for a right eye configuring the generated disparity image are once exchanged, but the image for a left eye and the image for a right eye may be generated such that the right and left configurations of the disparity image are exchanged.

Furthermore, in this case, the configuration of the HMD system may be the same as that of FIG. 12, and in the display processing, processing may be performed such that the right and left disparity images are exchanged (reversed) instead of the processing of generating an image having no disparity in the processing of Step S114 regarding the flowchart of FIG. 13, and thus, the detailed description will be omitted. In addition, in a case where the right and left disparity images are exchanged (reversed), the disparity images may be interpolation-generated and exchanged, or the right and left disparity images interpolation-generated in advance may be exchanged.

5. Application Example of First Embodiment

In the first embodiment, an example has been described in which in a case where it is determined that there is a collapse in the disparity image, the viewing position in the entire celestial image based on the position information is shifted to the original point O, and thus, the disparity image having no collapse is generated, but in a case where a distance between the viewing position in the entire celestial image based on the position information and the original point O is large, a position to be displayed as the disparity image is largely changed, and thus, there is a concern that uncomfortable feeling occurs on the display.

Therefore, in a case where it is determined that there is a collapse in the disparity image, movement is gradually performed at each predetermined distance between the viewing position in the entire celestial image based on the position information and the original point O, and a rapid change in the viewing position is suppressed, and thus, the occurrence of uncomfortable feeling may be suppressed, and the occurrence of sickness may be suppressed.

Figure 15:
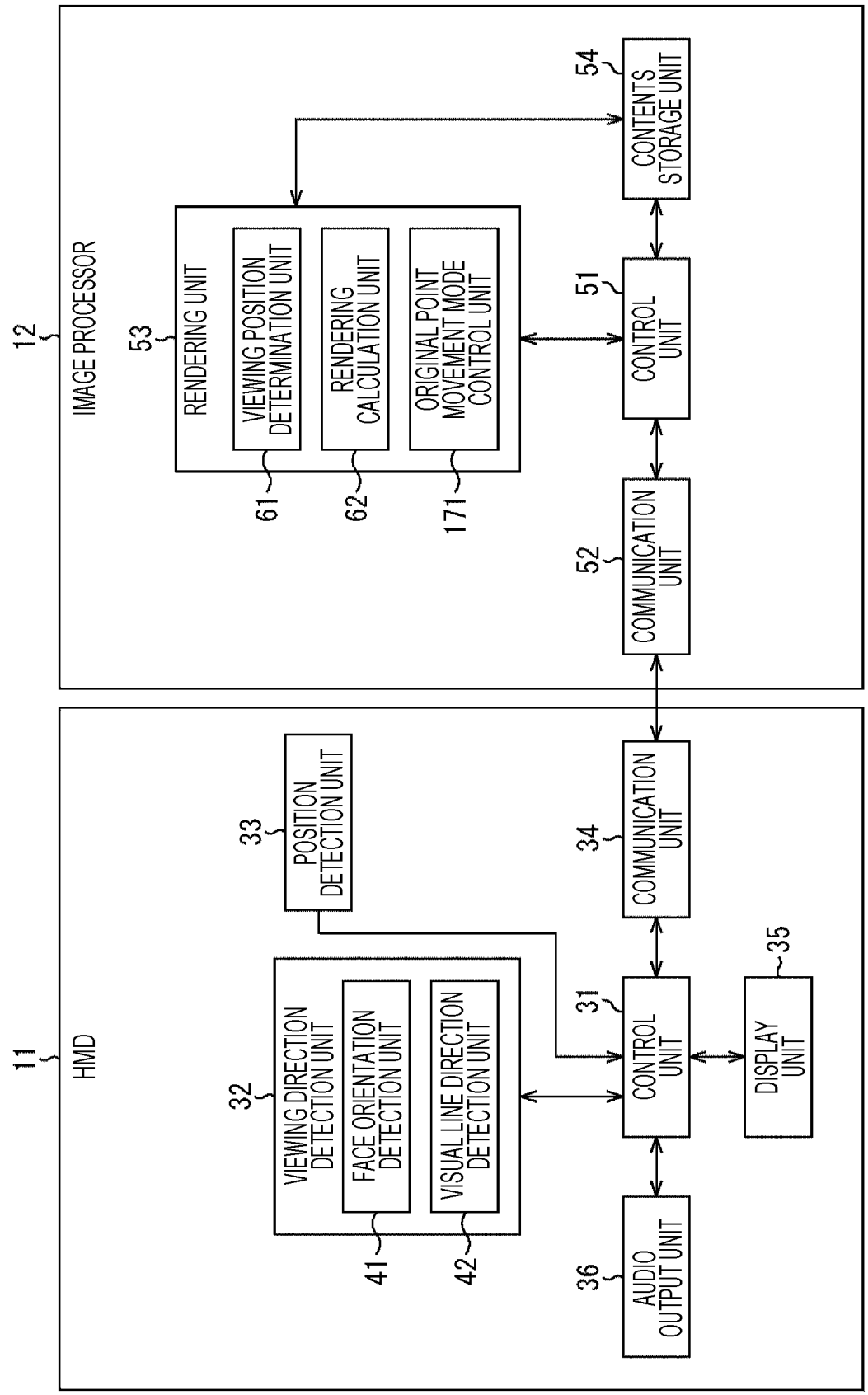
FIG. 15 is a block diagram illustrating an application example of the first embodiment of the HMD system according to the embodiment of the present disclosure.

FIG. 15 illustrates a configuration example of an HMD system in which in a case where it is determined that there is a collapse in the disparity image, the movement may be gradually performed at each predetermined distance between the viewing position in the entire celestial image based on the position information and the original point O.

The HMD system of FIG. 15 differs from the HMD system of FIG. 4 in that an original point movement mode control unit 171 is newly provided in the rendering unit 53.

In a case where it is determined that the disparity image collapses, the original point movement mode control unit 171 sets an original point movement mode to be in an on state, and in a case where it is determined that the disparity image does not collapse, the original point movement mode control unit 171 sets the original point movement mode to be in an off state.

In a case where the original point movement mode is in the on state, the rendering calculation unit 62 gradually moves, to the original point O, the viewing position in the entire celestial image based on the position information on the shortest path by a predetermined distance, and then, repeats processing of interpolation-generating the disparity image according to the rendering using the entire celestial image which is specified as the range of the viewing direction in the moved viewing position.

Figure 16:
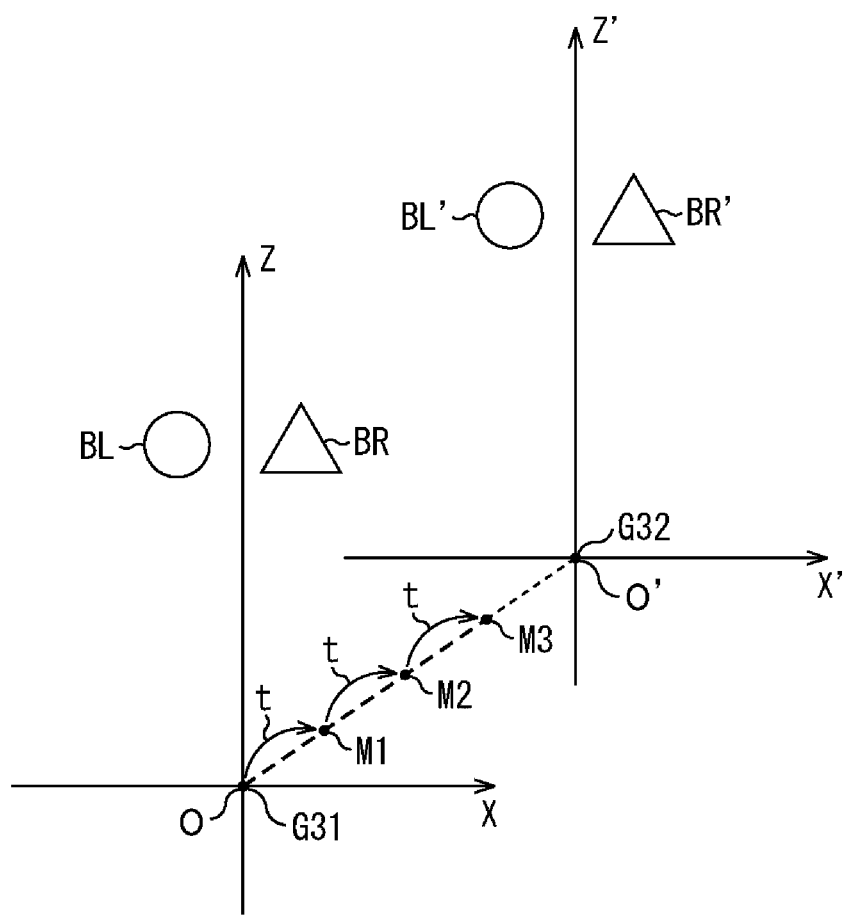
FIG. 16 is a diagram illustrating an example where the original point of the entire celestial image is gradually moved to the viewing position.

That is, as illustrated in FIG. 16, in a case where the viewing position in the entire celestial image based on the position information is a viewing position G32, and the original point O of the entire celestial image is a position G31, it is necessary that the original point O is moved to the position G32, and thus, a collapse in the disparity image is suppressed.

However, in a case where a distance between the positions G31 and G32 is greater than the predetermined distance, when the original point O is moved from the position G31 to the position G32, there is no collapse in the disparity image to be generated, but the image, in which the viewing position in the entire celestial image is largely changed, is displayed.

Therefore, in a case where the position G32, which is the viewing position based on the position information, and the position G31, which is the original point O, are separated greater than the predetermined distance, the original point O is gradually moved along the shortest path from the position G31 to the position G32 by each predetermined distance. That is, in the initial processing, the rendering calculation unit 62 moves, to a position M1, the position of the original point O in the entire celestial image on a path from the position G31 towards the position G32 by a distance t, and interpolation-generates the disparity image using the moved viewing position as the standard. Then, in the next processing, the rendering calculation unit 62 moves the position of the original point O in the entire celestial image to the position M2 by the distance t from the position M1, and interpolation-generates the disparity image using the moved viewing position as the standard. Further, in the next processing, the rendering calculation unit 62 moves the position of the original point O in the entire celestial image to the position M3 by the distance t from the position M2, and interpolation-generates the disparity image using the moved viewing position as the standard.

The rendering calculation unit 62 repeats the similar processing insofar as the original point movement mode is turned on, and finally, moves the original point O from the position G31 to the position G32.

According to such processing, the original point O, which is the viewing position in the entire celestial image based on the position information, is gradually moved close to the position G32 by each predetermined distance t, and in a case where the viewing position is the original point O, there is no collapse in the disparity image, and thus, the original point movement mode is turned off, and returns to normal interpolation-generating using the viewing position corresponding to the position information as the standard.

As a result thereof, even in a case where there is a collapse in the disparity image in the state in which the viewing position is separated from the original point O by greater than or equal to a predetermined distance, the original point O with respect to the viewing position is gradually shifted by each predetermined distance, and thus, it is possible to suppress a large change in the disparity image to be interpolation-generated according to the rendering, and to suppress uncomfortable feeling and sickness due to a rapid change in the viewing of the stereoscopic image.

<Display Processing of HMD System of FIG. 16>

Figure 17:
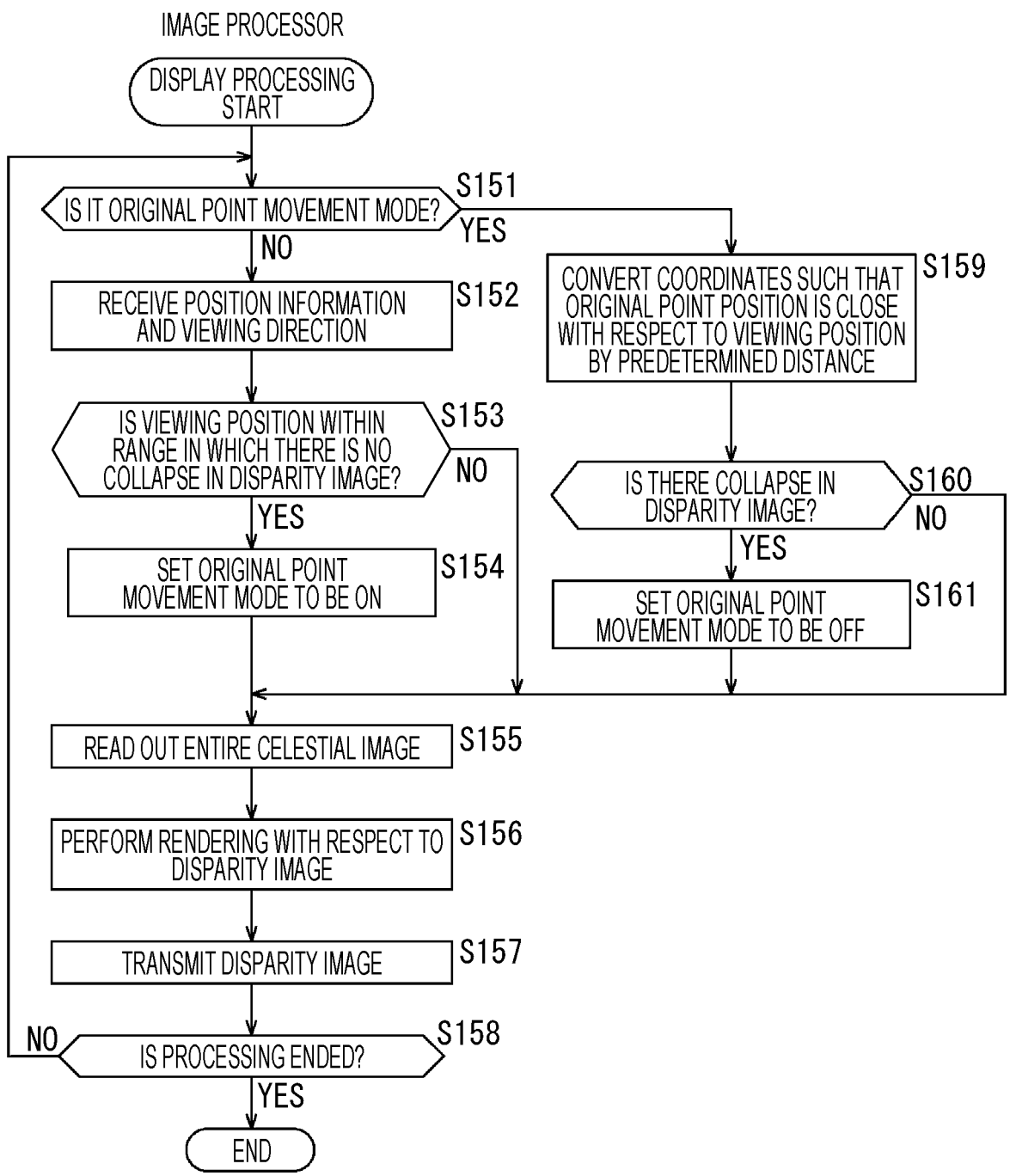
FIG. 17 is a flowchart illustrating display processing of the HMD system of FIG. 15.

Next, display processing of the HMD system of FIG. 15 will be described with reference to a flowchart of FIG. 17. Furthermore, in the flowchart of FIG. 17, the processings of HMD 11 are similar to the processings of Steps S11 to S18 of FIG. 6, and thus, the description thereof will be omitted.

That is, in Step S151, the rendering calculation unit 62 determines whether or not the original point movement mode is turned on by inquiring to the original point movement mode control unit 171. In Step S151, in a case where it is determined that the original point movement mode is not turned on, the processing proceeds to Step S152.

In Step S152, the communication unit 52 of the image processor 12 receives the position information of the HMD 11 and the information of the viewing direction, which are transmitted from the HMD 11, and outputs the received information to the control unit 51. The control unit 51 outputs the acquired position information of the HMD 11 and the acquired information of the viewing direction to the rendering unit 53.

In Step S153, the rendering unit 53 controls the viewing position determination unit 61, and determines whether or not there is a collapse in the disparity image, on the basis of whether or not the information of the viewing position in the entire celestial image corresponding to the position information is within a predetermined range with respect to the original point position.

In Step S153, in a case where it is determined that there is a collapse in the disparity image, the processing proceeds to Step S154.

In Step S154, the original point movement mode control unit 171 controls the original point movement mode to be in the on state.

Furthermore, in Step S153, in a case where it is determined that there is no collapse in the disparity image, the processing of Step S154 is skipped.

In Step S155, the rendering unit 53 the rendering calculation unit 62 to read out the data of the contents of the entire celestial image, which is stored in the contents storage unit 54.

In Step S156, the rendering unit 53 interpolation-generates the disparity image according to the rendering by using the image of the range specified at the time of seeing the viewing direction from the viewing position in the entire celestial image, which is the contents, with respect to the rendering calculation unit 62, and outputs the generated disparity image to the control unit 51.

In Step S157, the control unit 51 controls the communication unit 52 and causes the communication unit 52 to transmit the disparity image, which is interpolation-generated according to the rendering, to the HMD 11.

In Step S158, the control unit 51 determines whether or not the processing is ended, and in a case where the processing is not ended, the processing returns to Step S151.

In Step S151, in a case where the original point movement mode is turned on, the processing proceeds to Step S159.

In Step S159, the rendering calculation unit 62 performs the coordinate conversion such that a position corresponding to the original point O in the entire celestial image comes close to the viewing position in the entire celestial image specified on the basis of the position information of the user by a predetermined distance (for example, by the distance t of FIG. 16).

In Step S160, the rendering calculation unit 62 determines whether or not the original point O in the entire celestial image is in a position sufficiently close to the current viewing position, and there is no collapse in the disparity image.

In Step S160, in a case where it is considered that there is a collapse in the disparity image, the processing of Step S161 is skipped, the processing proceeds to Step S155, and the disparity image is interpolation-generated according to the rendering by using the image of the range in the entire celestial image specified at the time of seeing the viewing direction from the current viewing position.

That is, in a case where it is considered that there is a collapse in the disparity image, the original point movement mode is continuously in the on state, and thus, the processings of Steps S151, and S155 to S160 are repeated, and the processing of interpolation-generating and displaying the disparity image while the original point O in the entire celestial image is gradually moved to the viewing position, is repeated.

Then, in a case where the original point O of the entire celestial image gradually comes close sufficiently to the current viewing position, in Step S160, it is considered that there is no collapse in the disparity image, and the processing proceeds to Step S161.

In Step S161, the original point movement mode control unit 171 controls the original point movement mode to be in the off state, and the processing proceeds to Step S155.

According to such processing, even in a case where there is a collapse in the disparity image in the state in which the viewing position is separated from the original point O by greater than or equal to a predetermined distance, the original point O in the entire celestial image with respect to the viewing position is gradually shifted by the predetermined distance, and thus, it is possible to suppress a large change in the disparity image which is interpolation-generated according to the rendering, and to suppress the occurrence of uncomfortable feeling and sickness due to a rapid change in the viewing position in the viewing of the stereoscopic image.

In other words, in a case where the viewing position is not separated from the original point O by greater than or equal to the predetermined distance, the disparity image according to the viewing position is displayed, and in a case where the viewing position is separated from the original point O by greater than or equal to the predetermined distance, the disparity image in which the original point O gradually comes close to the viewing position, is displayed by being switched. That is, in a case where the viewing position is not separated from the original point O by greater than or equal to the predetermined distance, the rendering unit 53 generates the disparity image according to the viewing position (the normal disparity image), as a first mode, and in a case where the viewing position is separated from the original point O by greater than or equal to the predetermined distance, generates the disparity image in which the original point O gradually comes close to the viewing position, as a second mode. As a result thereof, the mode of generating the disparity image according to the viewing position and the mode of generating the disparity image in which the original point O gradually comes close to the viewing position, are switched according to the distance between the viewing position and the original point O, and thus, it is possible to suppress a collapse in the disparity image or sickness due to the viewing of the stereoscopic image.

Furthermore, in the above description, an example has been described in which the original point position in the entire celestial image comes close to the viewing position by each predetermined distance, but the original point position may gradually come close to the viewing position, and thus, for example, the original point position may gradually come close to the viewing position in the remaining distance at a predetermined ratio rather than the predetermined distance. In addition, in the above description, an example has been described in which the viewing position and the original point in the entire celestial image are gradually close to each other on the shortest path, but the original point position may come close to the viewing position gradually rather than the shortest path.

In addition, in the above description, in the first embodiment, an example has been described in which the presence or absence of a collapse in the disparity image is determined on the basis of whether or not the viewing position is within a predetermined range with respect to the original point position in the coordinate system of the entire celestial image, and in a third embodiment, an example has been described in which the presence or absence of a collapse in the disparity image is determined on the basis of whether or not the viewing direction is within the predetermined range in the coordinate system of the entire celestial image, but the presence or absence of a collapse in the disparity image may be determined by combining the embodiments.

Further, both of the viewing position and the viewing direction in the coordinate system of the entire celestial image are information specifying a viewing posture of the user wearing the HMD, and thus, will be collectively referred to as viewing information. In addition, it can be said that the viewing information is the information specifying the viewing posture of the user wearing the HMD 11, and is also information specifying a viewing posture of the HMD 11 itself.

Accordingly, in the HMD system of the present disclosure, in a case where the viewing information satisfies a predetermined condition, the disparity image is interpolation-generated and displayed by the entire celestial image, and in a case where the viewing information does not satisfy the predetermined condition, the coordinate conversion of moving the viewing position to the original point position in the entire celestial image is performed, and then, the disparity image is interpolation-generated, or the disparity image having no right and left disparity is interpolation-generated, and thus, a collapse in the disparity image is suppressed by generating the disparity image according to a method different from the processing of generating the normal disparity image.

In other words, in the HMD system of the present disclosure, the first mode of generating the image for a left eye and the image for a right eye configuring the normal disparity image to be generated according to the viewing position, and the second mode of generating the image for a left eye and the image for a right eye by the method different from the processing of generating the normal disparity image are switched and the image for a left eye and the image for a right eye, which are generated in each of the modes, are displayed, and thus, a collapse in the disparity image and sickness due to the viewing of the stereoscopic image are suppressed.

In addition, in a second embodiment, an example has been described in which the coordinate conversion is performed such that the original point in the entire celestial image is shifted to the viewing position at a timing when the disparity image collapses and the user blinks, but the first embodiment and the third embodiment may be combined.

Further, in the embodiments, the modification example, and the application example described above, an example has been described in which the functions described above are realized by the HMD system including the HMD 11 and the image processor 12, but for example, the functions of the rendering unit 53 and the contents storage unit 54 of the image processor 12 may be provided in the HMD 11, and the functions described above may be realized only by the HMD.

In addition, herein, an example using the HMD 11 has been described, but it is possible to realize the functions described above even in a case where a smart phone is similarly used as the HMD 11 by installing an application program in the smart phone, by mounting the smart phone on the head of the user, by allowing the display unit to set the display region corresponding to the display portion for a left eye and the display portion for a right eye, and by displaying the image for a left eye and the image for a right eye, which are the disparity image.

6. Example Executed by Software

Here, a set of processings described above can be executed by hardware, and can be also executed by software. In a case where the set of processings are executed by the software, a program configuring the software is installed in a computer incorporated in dedicated hardware, or for example, a general-purpose personal computer or the like in which various programs are installed, and thus, various functions can be executed, from a recording medium.

FIG. 18 illustrates a configuration example of the general-purpose personal computer. A central processing unit (CPU) 1001 is built in the personal computer. An input/output interface 1005 is connected to the CPU 1001 through a bus 1004. A read only memory (ROM) 1002 and a random access memory (RAM) 1003 are connected to the bus 1004.

An input unit 1006 including an input device such as a keyboard and a mouse, through which the user inputs an operation command, an output unit 1007 outputting an image of a processing operation screen or a processing result to a display device, a storage unit 1008 including a hard disk drive or the like storing a program or various data items, and a communication unit 1009 including a local area network (LAN) adapter or the like, which executes communication processing through a network represented by the Internet, are connected to the input/output interface 1005. In addition, a drive 1010 reading and writing data with respect to a removable medium 1011 such as a magnetic disk (including a flexible disk), an optical disk (including a compact disc-read only memory (CD-ROM) and a digital versatile disc (DVD)), a magnetooptical disk (including a mini disc (MD)), or a semiconductor memory, is connected to the input/output interface 1005.

The CPU 1001 executes various processings according to a program which is stored in the ROM 1002, or a program which is read out from the removable medium 1011 such as a magnetic disk, an optical disk, a magnetooptical disk, or a semiconductor memory, is installed in the storage unit 1008, and is loaded from the storage unit 1008 to the RAM 1003. Data or the like, which is necessary for the CPU 1001 to execute various processings, is also suitably stored in the RAM 1003.

In the computer configured as described above, the CPU 1001, for example, loads the program stored in the storage unit 1008 in the RAM 1003 through the input/output interface 1005 and the bus 1004, and executes the program, and thus, the set of processings described above is performed.

The program executed by the computer (the CPU 1001), for example, can be provided by being recorded in the removable medium 1011 as a package media or the like. In addition, the program can be provided through a wired or wireless transmission medium such as a local area network, the Internet, digital satellite broadcasting.

In the computer, the program can be installed in the storage unit 1008 through the input/output interface 1005 by mounting the removable medium 1011 on the drive 1010. In addition, the program can be received in the communication unit 1009 through the wired or wireless transmission medium, and can be installed in the storage unit 1008. In addition, the program can be installed in advance in the ROM 1002 or the storage unit 1008.

Furthermore, the program executed by the computer may be a program in which the processing is performed in chronological order according to the sequence described herein, or may be a program in which the processing is performed in parallel or at a necessary timing, for example, when calling is performed.

Furthermore, the functions of the control units 31 and 51 are realized by the CPU 1001 in FIG. 18. In addition, the contents storage unit 54 is realized by the storage unit 1008.

In addition, herein, the system indicates an assembly of a plurality of constituents (a device, a module (a component), and the like), and it does not matter whether or not all of the constituents are in the same housing. Therefore, both of a plurality of devices which are contained in a separate housing, and are connected to each other through a network, and one device in which a plurality of modules are contained in one housing, are a system.

Furthermore, the embodiments of the present disclosure are not limited to the embodiments described above, and various changes can be performed within a range not departing from the gist of the present disclosure.

For example, in the present disclosure, a cloud computing configuration in which one function is processed by being shared in a plurality of devices or is cooperatively processed in the plurality of devices, through a network, can be adopted.

In addition, each step described in the above flowchart can be executed by one device, or can be executed by being shared in a plurality of devices.

Further, in a case where a plurality of processings are included in one step, the plurality of processings included in one step can be executed by one device, or can be executed by being shared in a plurality of devices.

A summary embodiment of the present invention will now be described. The summary embodiment encompasses suitable combinations of the above described embodiments, as explained herein below.

In the summary embodiment of the present invention, an image processor is provided for generating a left eye image and a right eye image. Hence the image processor may generate a stereoscopic image for a user, or, as described herein, may generate an adapted image pair for the user when the disparity that gives rise to the stereoscopic illusion at least partially fails (collapses).

The images are generated for a user having a user viewpoint. This viewpoint typically comprises at least one of a position and a direction of view, as described elsewhere herein.

The generated images are based on at least a first source image having a reference viewpoint. The source image may for example be a cylindrical or spherical panoramic image as described elsewhere herein. The reference viewpoint is typically a notional origin or central viewing position (for example at the centre of the sphere or cylinder), and a default viewing direction (for example a particular direction on a horizontal plane having zero angular elevation, or any direction on the horizontal plane).

In the summary embodiment, the image processor comprises an image generating unit configured to detect whether a difference between the user viewpoint and the reference viewpoint is less than a threshold value.

As is explained elsewhere herein, this difference may comprise one or both of the view point position and view point direction of view. A respective threshold value, corresponding to a range deviating from the reference viewpoint within which the disparity does not collapse, is provided as described elsewhere herein. For example a different in position may be in the range Z1, whilst a different in elevation may be in the range Z1.

Furthermore, in some cases different effects on disparity may occur at different ranges. Hence whilst a collapse in disparity may occur outside range Z1, a reversal in disparity may occur when transitioning a viewing angle of 90 degrees, and so require additional or alternative adaptation of the images, as described elsewhere herein.

If the image generating unit detects that a difference is within a threshold value, then it can be assumed that the disparity between the left and right eye images is acceptable, and the image generating unit can proceed to generate a left eye image and a right eye image for the user having the user viewpoint.

However, if the image generating unit detects that a difference is outside a threshold value, then it can be assumed that the disparity between the left and right eye images is in some manner unacceptable, and the image generating unit can generate an adapted version of at least one of the left eye image and right eye image for the user viewpoint. In this case, the nature of the adaptation may depend upon which aspect of the view point has exceeded a threshold difference with respect to the reference viewpoint, as will be explained herein below.

In an instance of the summary embodiment, the image generating unit is configured to detect a difference in viewing position between the user viewpoint and the reference viewpoint, as described previously herein with reference to the first embodiment.

If the difference between the user viewpoint and the reference viewpoint is not less than a threshold value (e.g. outside range Z1), then the image processor is configured to generate a left eye image and a right eye image for the user viewpoint, adapted so that the difference between the user viewpoint and the reference viewpoint becomes less than the threshold value.

Hence if the distance between the user viewpoint and the reference viewpoint exceeds the threshold distance, then one or both of the user viewpoint and reference viewpoint can be re-mapped to reduce the distance to less than the threshold distance, as described elsewhere herein.

In one case of this instance, the image processor is configured to generate a left eye image and a right eye image for the user viewpoint, adapted so that the user viewpoint is made substantially coincident with the reference viewpoint. This may be done for example by re-mapping the user's position back to the position of the reference viewpoint.

In an alternative case of this instance, as described previously herein with reference to the application example of the first embodiment, the size of the apparent jump in viewpoint position caused by re-mapping directly back to the reference position can be reduced, thereby mitigating possible disorientation for the user. Accordingly in this case the image processor is configured to generate a sequence of one or more left eye images and right eye images for the user viewpoint, adapted so that the user viewpoint becomes iteratively closer to the reference viewpoint. The iterations may be of a predetermined interval (size), or may be a predetermined distance ratio (i.e. proportional to the remaining distance that the viewpoint is to be moved).

Alternatively or in addition, as described previously herein with reference to the second embodiment, in order to mitigate any disorientation caused by an apparent change in position, a re-mapping of the relative position of the user viewpoint and the reference viewpoint (whether in one step or iteratively) may only occur when the user's view is temporarily interrupted.

Hence in an instance of the summary embodiment, the image processor is configured to generate a left eye image and a right eye image for the user adapted so that the difference between the user viewpoint and the reference viewpoint becomes less than the threshold value, when the user's view is temporarily interrupted.

The interruption can be caused for example when the user nods, turns or blinks as described elsewhere herein. Consequently, in a case of this instance of the summary embodiment, the image processor may comprise a blink detection unit configured to detect the presence or absence of a blink based upon an image of the user's eyes, as described elsewhere herein.

Alternatively or in addition to mitigating a difference in distance between the user viewpoint and the reference viewpoint, in an instance of the summary embodiment the image generating unit is configured to detect a difference in viewing direction elevation between the user viewpoint and the reference viewpoint, as described previously herein with reference to the third embodiment.

As noted previously herein, the direction elevation of the reference viewpoint may be assumed to be zero degrees (i.e. on a horizontal plane). Whilst the user's viewpoint remains within a threshold value (predetermined difference) to this reference elevation (e.g. within the angular range Z1), then the image generating unit may generate a left eye image and a right eye image for the user having the user viewpoint.

However, in an instance of the summary embodiment, if the difference between the user viewpoint and the reference viewpoint is not less than the threshold value (e.g. outside the angular range Z1), then the image processor is adapted to generate a left eye image and a right eye image for the user viewpoint adapted to have no disparity between the images. As a result, the left and right eye images are typically the same. In other words, at least one of the left and right eye images is effectively an adapted version by virtue of no longer having disparity with respect to the other image.

It will be appreciated that, when the user's viewpoint is in the vicinity of the threshold angular elevation value, optionally a transitional range may be provided (either preceding, following or spanning the threshold angular elevation value), in which the disparity between the left and right images is scaled from normally generated disparity down to zero disparity, so that the stereoscopic effect on the user is progressively reduced, gradually flattening the perceived image as they reach, cross or pass the threshold angular elevation value (depending on where the transitional range is applied).

As was noted previously, a separate adaptation may be required if the threshold angular elevation value is 90 degrees, as described herein with reference to the modification example of the third embodiment. As described therein, this separate adaptation is due to the left-to-right viewpoint of the user reversing when they transition over the pole of a spherical image (based upon a spherical panorama or a cylindrical panorama mapped to a sphere).

Hence in an instance of the summary embodiment, if the difference between the user viewpoint and the reference viewpoint is not less than a threshold value (such as 90 degrees), then the image processor is configured to generate a left eye image and a right eye image for the user viewpoint, adapted by exchanging the left and right eye images.

It will be appreciated that, if used in conjunction with the technique of reducing the disparity to zero, there would be no visible change to the output images (since both would be the same) when near 90 degrees, but clearly if the user continued to increase their viewing angle they would eventually be back within an elevation range that would permit disparity again—in which case the exchange would be relevant to proper viewing of the images. Meanwhile of course if the technique of reducing the disparity to zero is not employed, then the exchange would be immediately relevant to proper viewing of the images.

In order to detect a viewing direction of the user, in an instance of the summary embodiment the image processor comprises a viewing direction detection unit configured to detect a viewing direction based upon a detected face orientation direction and a detected visual line direction, as described elsewhere herein.

In a second summary embodiment of the present invention for the method of operation of an image processor, corresponding to the first summary embodiment, a control method for an image processor operable to generate a left eye image and a right eye image for a user having a user viewpoint, based on at least a first source image having a reference viewpoint, comprises a difference detection step of detecting whether a difference between the user viewpoint and the reference viewpoint is less than a threshold value. If so, a first image generation step comprises generating a left eye image and a right eye image for the user having the user viewpoint. If not, a second image generation step comprises generating an adapted version of at least one of the left eye image and right eye image for the user viewpoint.

It will be apparent to a person skilled in the art that variations in the above method corresponding to operation of the various embodiments of the apparatus as described and claimed herein are considered within the scope of the present invention, including but not limited to the following instances:

An instance in which the difference detection step comprises detecting a difference in viewing position between the user viewpoint and the reference viewpoint, and if the difference between the user viewpoint and the reference viewpoint is not less than a threshold value, then the second image generation step comprises generating a left eye image and a right eye image for the user viewpoint, adapted so that the difference between the user viewpoint and the reference viewpoint becomes less than the threshold value;
  A case of this instance in which the second image generation step is further conditional on the user's view being temporarily interrupted;
  In this case, detecting the presence or absence of a blink based upon an image of the user's eyes;
  A case of this instance in which the second image generation step comprises generating a left eye image and a right eye image for the user viewpoint, adapted so that the user viewpoint is made substantially coincident with the reference viewpoint;
  A case of this instance in which the second image generation step comprises generating a sequence of one or more left eye images and right eye images for the user viewpoint, adapted so that the user viewpoint becomes iteratively closer to the reference viewpoint;
  In this case, the iteration is one selected from the list consisting of a predetermined interval, and a predetermined distance ratio;
An instance in which the difference detection step comprises detecting a difference in viewing direction elevation between the user viewpoint and the reference viewpoint;
  A case of this instance in which if the difference between the user viewpoint and the reference viewpoint is not less than a threshold value, then the second image generation step comprises generating a left eye image and a right eye image for the user viewpoint adapted to have no disparity between the images;
  A case of this instance in which if the difference between the user viewpoint and the reference viewpoint is not less than a threshold value (such as 90 degrees), then the second image generation step comprises generating a left eye image and a right eye image for the user viewpoint, adapted by exchanging the left and right eye images; and
  A case of this instance, comprising detecting a viewing direction based upon a detected face orientation direction and a detected visual line direction.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Furthermore, the following configurations can be adopted in the present disclosure.

<1> An image processor, including:
  an image generating unit configured to
    generate two right and left images corresponding to a right eye and a left eye of a user in a predetermined mode using image data specified by viewing information of the user in a case where the viewing information of the user satisfies a predetermined condition, and
    generate two right and left images corresponding to the right eye and the left eye of the user in the other predetermined mode different from the predetermined mode in a case where the viewing information of the user does not satisfy the predetermined condition.

<2> The image processor according to <1>,
  in which the image generating unit
    generates the two right and left images in the predetermined mode using the image data specified by the viewing information of the user in a case where a viewing direction of the user in a coordinate system of the image data of the user satisfies a predetermined condition, and
    generates the two right and left images in the other predetermined mode in a case where the viewing direction of the user in the coordinate system of the image data of the user does not satisfy the predetermined condition.

<3> The image processor according to <2>,
  in which the image generating unit
    generates the two right and left images in the predetermined mode using the image data specified by the viewing direction of the user in a case where the viewing direction is within a range of a predetermined elevation angle of the coordinate system in the image data, and
    generates the two identical right and left images in the other predetermined mode using the image data specified by the viewing direction of the user in a case where the viewing direction is not within the range of the predetermined elevation angle of the coordinate system in the image data.

<4> The image processor according to <3>,
  in which the two right and left images are two right and left disparity images.

<5> The image processor according to <2>,
  in which the image generating unit
    generates the two right and left images in the predetermined mode using the image data specified by the viewing direction of the user in a case where the viewing direction is within a range of a predetermined elevation angle of the coordinate system in the image data, and
    generates the two right and left images in the other predetermined mode using the image data specified by the viewing direction of the user to be horizontally reversed, or generates the two right and left images such that the two right and left images are horizontally reversed, in a case where the viewing direction is not within the range of the predetermined elevation angle of the coordinate system in the image data.

<6> The image processor according to <5>,
  in which the two right and left images are two right and left disparity images.

<7> The image processor according to <2>, further including:
  a viewing direction detection unit configured to detect the viewing direction,
  in which the viewing direction detection unit further includes
  a face orientation direction detection unit configured to detect a face orientation direction of the user, and
  a visual line direction detection unit configured to detect a visual line direction of the user, and
  the viewing direction detection unit calculates the viewing direction by using the face orientation direction and the visual line direction.

<8> The image processor according to <1>,
  in which the image generating unit
  generates the two right and left images in the predetermined mode using the image data specified by the viewing information of the user in a case where a viewing position of the user in a coordinate system of the image data of the user satisfies a predetermined condition, and
  generates the two right and left images in the other predetermined mode in a case where the viewing position of the user in the coordinate system of the image data of the user does not satisfy the predetermined condition.

<9> The image processor according to <8>,
  in which the image generating unit
  generates the two right and left images in the predetermined mode using the image data specified on the basis of the viewing position of the user in a case where the viewing position is within a range of a predetermined distance from an original point of the coordinate system in the image data, and
  shifts the viewing position of the user to be the original point of the coordinate system in the image data, and generates the two right and left images in the other predetermined mode using the image data specified on the basis of the viewing position shifted to be the original point, in a case where the viewing position is not within the range of the predetermined distance from the original point of the coordinate system in the image data.

<10> The image processor according to <8>,
  in which the two right and left images are two right and left disparity images.

<11> The image processor according to <10>,
  in which the image generating unit gradually shifts the original point of the coordinate system in the image data to the viewing position, and generates the two right and left disparity images in the other predetermined mode using the image data specified on the basis of the shifted viewing position.

<12> The image processor according to <11>,
  in which the image generating unit gradually shifts the original point of the coordinate system in the image data to the viewing position at each predetermined interval, and generates the two right and left disparity images in the other predetermined mode using the image data specified on the basis of the shifted viewing position.

<13> The image processor according to <11>,
  in which the image generating unit gradually shifts the original point of the coordinate system in the image data to the viewing position by each predetermined distance ratio, and generates the two right and left disparity images in the other predetermined mode using the image data specified on the basis of the shifted viewing position.

<14> The image processor according to <11>,
  in which the image generating unit gradually shifts the original point of the coordinate system in the image data to the viewing position on a shortest path to the viewing position, and generates the two right and left disparity images in the other predetermined mode using the image data specified on the basis of the shifted viewing position.

<15> The image processor according to <10>,
  in which the image generating unit shifts the viewing position of the user to be the original point of the coordinate system in the image data, and generates the two right and left disparity images in the other predetermined mode using the image data specified on the basis of the viewing position shifted to be the original point, in a case where the viewing position is not within a range of a predetermined distance from the original point of the coordinate system in the image data and in a case where there is a change in a viewing state of the user.

<16> The image processor according to <15>,
  in which in a case where there is a change in the viewing state of the user, there are a timing when the user blinks, a timing when the user turns round, and a timing when the user nods.

<17> A control method of an image processor, including:
  generating two right and left images corresponding to a right eye and a left eye of a user in a predetermined mode using image data specified by viewing information of the user in a case where the viewing information of the user satisfies a predetermined condition; and
  generating two right and left images corresponding to the right eye and the left eye of the user in the other predetermined mode different from the predetermined mode in a case where the viewing information of the user does not satisfy the predetermined condition.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

11 HMD
12 Image processor
31 Control unit
32 Viewing direction detection unit
33 Position detection unit
34 Communication unit
35 Display unit
36 Audio output unit
41 Face orientation detection unit
42 Visual line direction detection unit
51 Control unit
52 Communication unit
53 Rendering unit
54 Contents storage unit
61 Viewing position determination unit
62 Rendering calculation unit
91 Blink detection unit 101 Blink determination unit
141 Viewing direction determination unit
142 Rendering calculation unit
171 Original point movement mode control unit

The invention claimed is:

1. An image processor, for generating a left eye image and a right eye image for a user having a user viewpoint, based on at least a first source image having a reference viewpoint, the image processor comprising:
  circuitry configured to
    detect whether a difference between the user viewpoint and the reference viewpoint is less than a threshold value,
    generate a left eye image and a right eye image for the user having the user viewpoint when the difference between the user viewpoint and the reference viewpoint is less than the threshold value, and
    generate an adapted version of at least one of the left eye image or the right eye image for the user viewpoint when the difference between the user viewpoint and the reference viewpoint is greater than or equal to the threshold value,
  wherein the difference between the user viewpoint and the reference viewpoint includes at least one of a difference between respective viewpoint positions or a difference between respective viewpoint directions,
  wherein the difference between the respective viewpoint positions includes a difference between a viewing position of the user viewpoint and a viewing position of the reference viewpoint,
  wherein if the difference between the respective viewpoint positions is not less than a distance threshold value, then the circuitry generates the adapted version of the at least one of the left eye image or the right eye image for the user viewpoint, adapted so that the difference between the respective viewpoint positions becomes less than the distance threshold value, and
  wherein the circuitry is further configured to generate a sequence of one or more left eye images and right eye images for the user viewpoint, adapted so that the viewing position of the user viewpoint becomes iteratively closer to the viewing position of the reference viewpoint.

2. The image processor according to claim 1, wherein the circuitry generates the adapted version of the left eye image and the right eye image for the user adapted so that the difference between the respective viewpoint positions becomes less than the distance threshold value, when the user's view is temporarily interrupted.

3. The image processor according to claim 2, wherein the circuitry is further configured to detect presence or absence of a blink based upon an image of the user's eyes.

4. The image processor according to claim 1, wherein the circuitry generates the adapted version of the left eye image and the right eye image for the user viewpoint, adapted so that the viewing position of the user viewpoint is made substantially coincident with the viewing position of the reference viewpoint.

5. The image processor according to claim 1, wherein the iteration is one selected from the list consisting of:
  i. a predetermined interval; and
  ii. a predetermined distance ratio.

6. The image processor according to claim 1, wherein the difference between the respective viewpoint directions includes a difference between a viewing direction elevation of the user viewpoint and a viewing direction elevation of the reference viewpoint.

7. The image processor according to claim 6, wherein if the difference between the respective viewpoint directions is not less than an angular threshold value, then the circuitry generates the adapted version of the at least one of the left eye image or the right eye image for the user viewpoint adapted to have no disparity between the left eye image and the right eye image.

8. The image processor according to claim 6, wherein if the difference between the respective viewpoint directions is not less than an angular threshold value, then the circuitry generates the adapted version of the at least one of the left eye image or the right eye image for the user viewpoint, adapted by exchanging the left and right eye images.

9. The image processor according to claim 8, wherein the angular threshold value is a direction elevation of 90 degrees.

10. The image processor according to claim 6, wherein the circuitry is further configured to detect a viewing direction based upon a detected face orientation direction and a detected visual line direction.

11. A control method for an image processor operable to generate a left eye image and a right eye image for a user having a user viewpoint, based on at least a first source image having a reference viewpoint, the method comprising:
  detecting whether a difference between the user viewpoint and the reference viewpoint is less than a threshold value;
  generating a left eye image and a right eye image for the user having the user viewpoint when the difference between the user viewpoint and the reference viewpoint is less than the threshold value;
  generating an adapted version of at least one of the left eye image or the right eye image for the user viewpoint when the difference between the user viewpoint and the reference viewpoint is greater than or equal to the threshold value; and
  generating a sequence of one or more left eye images and right eye images for the user viewpoint, adapted so that the viewing position of the user viewpoint becomes iteratively closer to the viewing position of the reference viewpoint,
  wherein the difference between the user viewpoint and the reference viewpoint includes at least one of a difference between respective viewpoint positions or a difference between respective viewpoint directions,
  wherein the difference between the respective viewpoint positions includes a difference between a viewing position of the user viewpoint and a viewing position of the reference viewpoint, and
  wherein if the difference between the respective viewpoint positions is not less than a distance threshold value, then the adapted version of the at least one of the left eye image or the right eye image is generated for the user viewpoint, adapted so that the difference between the respective viewpoint positions becomes less than the distance threshold value.

12. The control method according to claim 11, wherein the adapted version of the at least one of the left eye image or the right eye image is generated when the user's view is temporarily interrupted.

13. The control method according to claim 12, further comprising:

detecting presence or absence of a blink based upon an image of the user's eyes.

14. The control method according to claim 11, wherein the adapted version of the at least one of the left eye image or the right eye image is adapted so that the viewing position of the user viewpoint is made substantially coincident with the viewing position of the reference viewpoint.

15. The control method according to claim 11, wherein the iteration is one selected from the list consisting of:
   i. a predetermined interval; and
   ii. a predetermined distance ratio.

16. The control method according to claim 11, wherein the difference between the respective viewpoint directions includes a difference between a viewing direction elevation of the user viewpoint and a viewing direction elevation of the reference viewpoint.

17. The control method according to claim 16, wherein if the difference between the respective viewpoint directions is not less than an angular threshold value, then the adapted version of the at least one of the left eye image or the right eye image is generated for the user viewpoint, adapted to have no disparity between the images.

18. The control method according to claim 16, wherein if the difference between the respective viewpoint directions is not less than an angular threshold value, then the adapted version of the at least one of the left eye image or the right eye image is generated for the user viewpoint, adapted by exchanging the left and right eye images.

19. The control method according to claim 18, wherein the angular threshold value is a direction elevation of 90 degrees.

20. The control method according to claim 16, further comprising:
   detecting a viewing direction based upon a detected face orientation direction and a detected visual line direction.

21. A non-transitory computer-readable storage medium having embodied thereon computer executable instructions, which when executed by a computer system cause the computer system to perform the method of claim 11.

* * * * *